(12) United States Patent
Brahler et al.

(10) Patent No.: US 12,285,980 B2
(45) Date of Patent: *Apr. 29, 2025

(54) RAR2 ADVANCED RAPID AIR RELEASE VALVE PNEUMATIC TIRE SEATER

(71) Applicant: Gaither Tool Company, Inc., Jacksonville, IL (US)

(72) Inventors: Richard Brahler, Jacksonville, IL (US); Jime W. Huang, Taichung (TW)

(73) Assignee: Gaither Tool Company, Inc., Jacksonville, IL (US)

( * ) Notice: Subject to any disclaimer, the term of this patent is extended or adjusted under 35 U.S.C. 154(b) by 380 days.

This patent is subject to a terminal disclaimer.

(21) Appl. No.: 17/695,195

(22) Filed: Mar. 15, 2022

(65) Prior Publication Data

US 2022/0274454 A1 Sep. 1, 2022

Related U.S. Application Data

(63) Continuation-in-part of application No. 16/134,095, filed on Sep. 18, 2018, now Pat. No. 11,273,677.

(51) Int. Cl.
*B60C 25/12* (2006.01)
*B05B 1/14* (2006.01)
*F16K 24/04* (2006.01)

(52) U.S. Cl.
CPC ............... *B60C 25/12* (2013.01); *B05B 1/14* (2013.01); *F16K 24/04* (2013.01)

(58) Field of Classification Search
CPC ......... B60C 25/12; B60C 25/145; B05B 1/14; F16K 24/04
USPC .......................................................... 157/1.1
See application file for complete search history.

(56) References Cited

U.S. PATENT DOCUMENTS 9,080,832 B2 * 7/2015 Brahler, II .......... F41H 13/0006

* cited by examiner

*Primary Examiner* — Hadi Shakeri
(74) *Attorney, Agent, or Firm* — Robinson & Cole LLP

(57) ABSTRACT

A pneumatic tire seater for seating a tubeless tire on a rim has an advanced rapid air release (RAR) valve mounted on a tank suitable for containing pressurized air. A nozzle is mounted on one end of the RAR valve, and the other end of the valve is in unconstrained pneumatic communication with the interior of the air tank. A piston is within a cylinder of the RAR valve. A control chamber behind the piston contains a compression spring. Control gas passageways provide constrained pneumatic communication between the control chamber and the air tank, passing control gas into the control chamber. In response to actuating a control mechanism, the air in the control chamber is vented out into the atmosphere causing the RAR valve to rapidly open, producing a blast of air of sufficient magnitude to seat a tire on a rim.

17 Claims, 11 Drawing Sheets

RAR2 ADVANCED RAPID AIR RELEASE VALVE PNEUMATIC TIRE SEATER

BACKGROUND

Technical Field

Various embodiments of the present invention relate to tools, and more specifically, to tools for seating tubeless vehicle tires on wheel rims.

Description of Related Art

Tires for automobiles, trucks and other vehicles are designed to be mounted on wheels or rims. In the past, an inner tube was inflated between the tire and the rim. It was fairly easy to mount a tire on a rim by simply inflating the inner tube until the tire's bead was seated on the rim. Today, however, tubeless tires—that is, tires without inner tubes—have almost entirely supplanted the older technology that relied on inner tubes. Today's tubeless tires last longer, are less prone to going flat, and provide better performance than the older tires utilizing inner tubes. However, tubeless tires tend to be much more difficult to mount on a wheel than the older tires with inner tubes.

To mount a tubeless tire, each of the beads (edges) of the tire must be held airtight all the way around the two edges of the rim on which they mount to form an airtight chamber within the tire and wheel. When a tire is first placed on a rim prior to being inflated, there is generally a gap between the bead of the tire and the wheel's rim that prevents inflation with an air compressor. Seating the tire on the rim allows the tire to be pressurized. In some cases, smaller tires may be seated by injecting air through the valve stem while pressing the tire's bead against the rim to create a seal (e.g., bicycle or motorcycle tires). But this is extremely difficult to do with larger tires such as truck tires.

It is known in the art that a high volume of air blown rapidly between the rim and the bead of the tire can seat the tire on the rim. To accomplish this conventional pneumatic tire seaters generally include a large, yet portable, pressurized air tank with a valve leading to a discharge barrel. The tank and discharge barrel may be positioned to blow a high volume of air from the pressurized air tank into the tire. The air tank of conventional devices must be of sufficient volume—e.g., at least 15 liters or more—to hold enough air at a high pressure to expand the tire against the rim, completely filling the volume of the tire to a pressure greater than the atmospheric pressure in order to seat the tire against the rim. The large 15+ liter air tanks of conventional tire seating devices are quite unwieldy and take longer to fill with pressurized air.

SUMMARY

The present inventors recognized a need for a pneumatic tire seater with a smaller air tank that is more convenient to store, lift and carry than conventional devices that require large, unwieldy air tanks. The various embodiments disclosed herein realize these and other benefits. The various embodiments disclose a pneumatic tire seater—sometimes called a bead seater—that includes an air tank for holding pressurized air, an advanced rapid air release (RAR) gas valve in unconstrained pneumatic communication with the interior of the air tank, and a nozzle connected to the RAR gas valve. The RAR gas valve has a piston configured to slide back and forth within a cylinder of the gas valve. A control chamber formed within the cylinder between the endcap of the gas valve and a proximal end of the piston. The control chamber contains a compression spring and a flexible cushion. The piston has one or more control gas passageways that provide constrained pneumatic communication between the control chamber and the pressurized air in the air tank.

The pneumatic tire seater has a nozzle connected to a distal end of the gas valve. The nozzle has one or more nozzle outlet holes configured to blow air into the gap between the tire and the wheel. A valve control mechanism can be actuated to open a control valve that pneumatically connects the control chamber to the atmosphere outside the tank. In response to the valve control mechanism being actuated, the gas valve releases pressurized air from the air tank through the nozzle in a burst that is sufficient to seat a tire on a rim. In this way a user can direct the nozzle into the gap between an uninflated tire on a rim to blow the pressurized air into the tire and seat the tire's bead on the rim.

DESCRIPTION OF THE DRAWINGS

The accompanying drawings, which are incorporated in and constitute part of the specification, illustrate various embodiments of the invention. Together with the general description, the drawings serve to explain the principles of the invention. In the drawings.

DETAILED DISCLOSURE

Figure 1A:
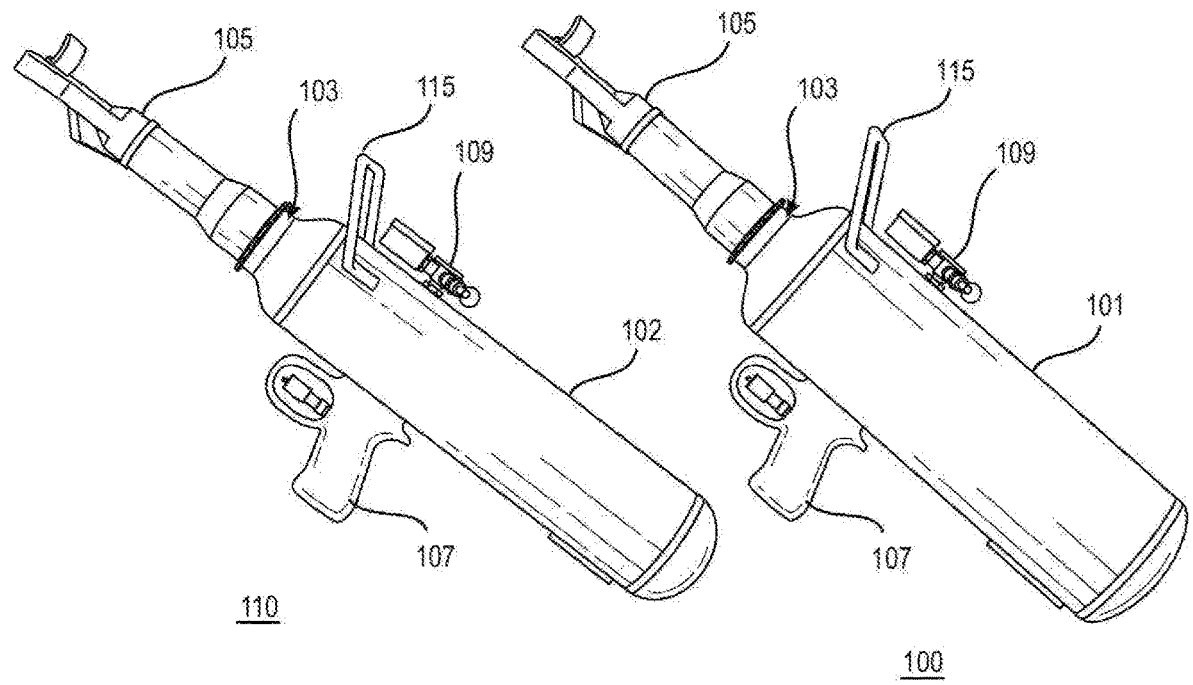
FIG. 1A depicts embodiments of rapid air release (RAR) pneumatic tire seaters with two different tank sizes according to various embodiments disclosed herein.

FIG. 1A depicts embodiments of rapid air release (RAR) pneumatic tire seaters with two different tank sizes according to various embodiments disclosed herein. Disclosed herein are various embodiments of tire seaters with high speed RAR valves for air or other gases, and methods of making and using the same. For the sake of simplicity the RAR valves are described herein in terms of releasing pressurized air held in the air tank 101. However, in actual practice, the various embodiments of the air tank and the high speed RAR valves may be used to hold and release any type of gas—that is, any type of substance in the gaseous state such as air, oxygen, carbon dioxide, nitrogen, or the like. The term "gas" as used herein is intended to mean a substance in the gaseous state. Also, it is more difficult to mount a cold tire (e.g., 40 degrees Fahrenheit) than a tire that is warmed up (e.g., 70 degrees Fahrenheit). Therefore, for the sake of consistency, it shall be assumed that the mounting of tires as discussed herein takes place with the tire at 70 degrees Fahrenheit and with the air in the tank before opening the valve also at 70 degrees Fahrenheit.

The RAR valve pneumatic tire seaters 100 and 110 depicted in FIG. 1A each have: air tank 101 (or 102), RAR valve 103, nozzle assembly 105, pistol grip handle 107, control cluster 109 and carry handle 115. Each RAR valve 103 is in unconstrained pneumatic communication with its respective air tank 101/102 of the pneumatic tire seaters 100/110. That is, air passes freely from the tank 101/102 to its RAR valve 103. In some embodiments the RAR valve 103 may be connected to the tank via pipes, tubes or other passageways. In other embodiments such as those depicted in FIGS. 1A-B the RAR valve 103 extends into the tank leaving only the collar that is affixed to the tank visible from the outside. Further details of the components making up the RAR valve 103 are depicted in FIGS. 3A-D and FIGS. 5A-B, and are discussed in the ensuing pages.

The embodiments 100 and 110 depicted in FIG. 1A have air tanks 101 and 102, respectively, with a cylindrical body and rounded ends. The air tank 101 of RAR valve pneumatic tire seater 100 contains 6 liters of space for air. The air tank 102 of RAR valve pneumatic tire seater 110 contains 3 liters of space for air. (The air volume in air tanks 101 and 102 may be slightly less than 6 and 3 liters, respectively, since the RAR valve 103 takes up some space inside the tank.) The 6 liter air tank 101 depicted in FIG. 1A has an outside diameter of approximately 5.5 inches and a cylindrical body length (between the welds at the rounded ends) of approximately 17 inches. The 3 liter air tank 102 depicted in FIG. 1A has an outside diameter of approximately 4 inches and a cylindrical body length (between the welds at the rounded ends) of approximately 19 inches. Various embodiments are implemented with different sized cylindrical air tanks, including for example tanks with outside diameters, or ranges of outside diameters, including: 4.0 inches, 5.0 inches, 6.0 inches, greater than 3.75 inches, greater than 4.75 inches, greater than 5.75 inches, between 3.75 and 6.5 inches; and/or between 3.75 and 10.5 inches in diameter.

It is a requirement that any air tank sold commercially be certified by one or more governmental agencies. One of the most stringent certification agencies is Conformité Européenne (CE). Various sized tanks of different embodiments disclosed herein are CE certified to at least 200 pounds per square inch (psi). Various other embodiments are certified at pressures falling within other ranges, including the range of no less than 250 psi of air, the range of no less than 300 psi of air, the range of no less than 400 psi of air, and the range of no less than 800 psi of air. Yet other embodiments are certified at ranges different from those listed above, as is known by those of ordinary skill in the art. It should be understood that there is a practical upper limit to all of the above recited pressure certification ranges based on material strength of the components and the safety of the device being used at ultra high pressures. Although the value of the upper limit is not known with precision, an upper limit of 3,000 psi is hereby stated. In practice the tanks are generally filled with considerably less air than the maximum amount they are certified to hold. For example, a given tank embodiment certified at 300 psi of air may often be inflated to an amount within the range of 100 psi to 120 psi for use in seating a tire. The tank pressure used to seat a tire depends largely upon the tire size, but also depends upon a number of factors, including the flexibility of the tire, and the direction/distance of the nozzle with respect to the gap between the tire and the rim. The ASME Boiler Code includes standards that apply to devices with tanks for holding high pressure gases such as the pneumatic tire seater. However, ASME Boiler Code 2010 Section VIII Division 1 paragraph U-1(c)(2)(i) provides an exception for vessels having an inside diameter, width, height or cross section diagonal not exceeding 6 inches with no limitation on length of vessel or pressure. For this reason, various embodiments disclosed herein are implemented with cylindrical air tanks having an inner diameter of no greater than 6.0 inches. The tank inner diameter is tank diameter as $D_T$ 683 shown in FIG. 6A minus two-times (2×) the wall thickness—that is, minus the wall thickness on each side.

Figure 1B:
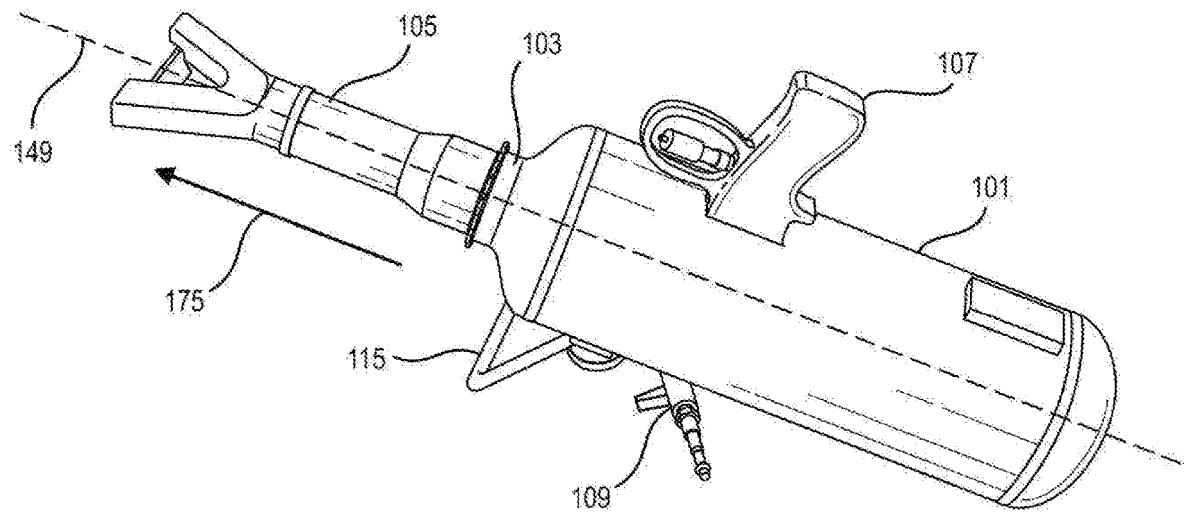
FIG. 1B depicts an RAR pneumatic tire seater in the upside down stowed position according to various embodiments disclosed herein.
Figure 6A:
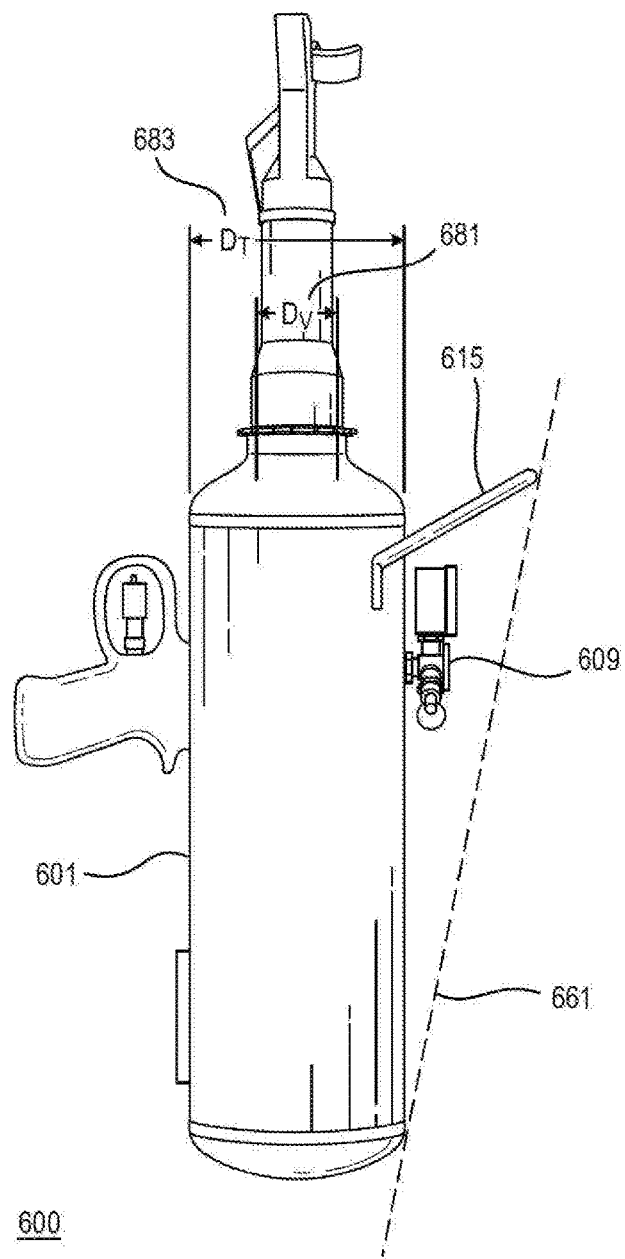
FIGS. 6A-B respectively depict a side view and a top view of an RAR pneumatic tire seater to illustrate aspects of the control cluster, according to various embodiments disclosed herein.
Figure 6B:
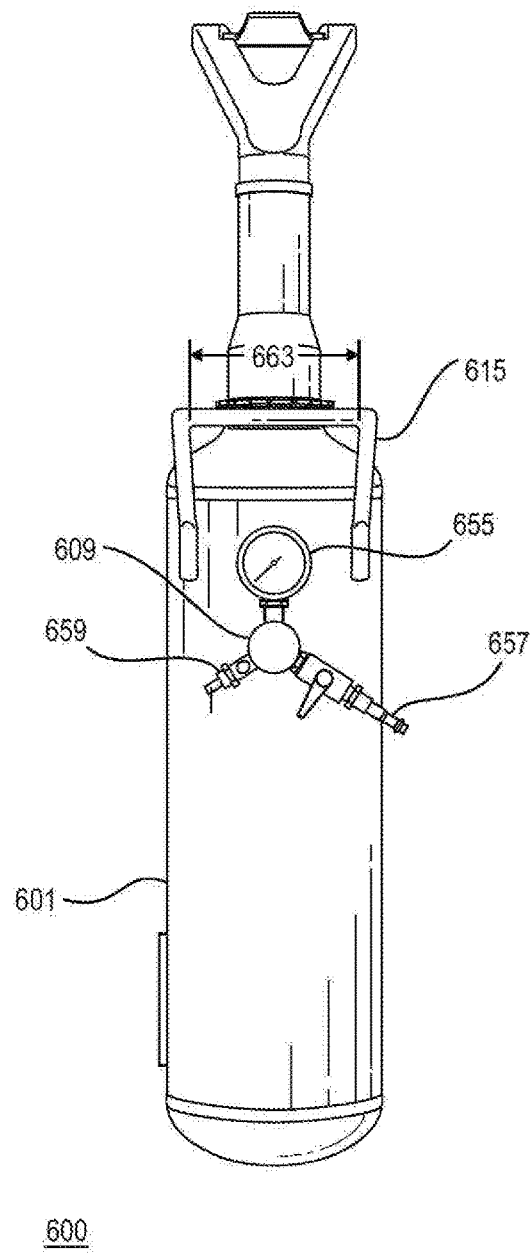

In various embodiments the tank 101 has a control cluster 109 mounted on it. Details of control cluster are shown in FIGS. 6A-B. In various embodiments the control cluster 109 is mounted on the top of tank 101, near a carry handle 115, and a pistol grip handle 107 is mounted on the bottom of tank 101. As shown in FIG. 1B the air tank 101, the RAR valve 103 and the nozzle assembly 105 are aligned along a central axis 149. In other embodiments the air tank 101, the RAR valve 103 and/or the nozzle assembly 105 may not all be aligned along the same central axis. For example, either the RAR valve 103 or the nozzle assembly 105, or both, may be mounted off-center with respect to central axis 149 of the air tank 101. In such off-center embodiments the RAR valve 103 has a different central axis than the central axis 149 of the air tank.

The carry handle 115 is fastened on tank 101 in a position making it easy to lift and carry the RAR valve pneumatic tire seater 100. Various embodiments of the carry handle 115 may have a handhold bar that is orthogonal to the central axis 149 of cylindrical tank 101. When a user holds the RAR valve pneumatic tire seater 100 by carry handle 115, the tank 101 tilts downward and nozzle assembly 105 tilts upward (at approximately a 60 degree angle). In this way, the RAR valve pneumatic tire seater 100 can conveniently be hung on a hook or specially designed bracket attached to either a ceiling or a wall, allowing the nozzle assembly 105 to point upwards and the tank to hang down. A user can lay the RAR valve pneumatic tire seater 100 on its side and the carry handle 115 will prevent the device from being inadvertently rolled over, damaging the control cluster 109. A user can also sit the RAR valve pneumatic tire seater 100 upside down as shown in FIG. 1B, balanced on the handhold bar of carry handle 115 with pistol grip handle 109 pointing upwards. The carry handle 115 provides sufficient clearance to avoid damaging the control cluster 109.

In other embodiments the pistol grip handle 107 and control cluster 109 may be mounted in different positions on the RAR valve pneumatic tire seater. For example, in another embodiment the pistol grip handle 107 may be mounted on the right side of tank 101 (e.g., to be held in the right hand of a right handed person), or the pistol grip handle 107 may be mounted on the left side (e.g., to be held in the left hand of a left handed person). Similarly, in other embodiments the control cluster 109 may be mounted on the bottom, or the front, or the rear. In the embodiments depicted in FIGS. 1A-B the pistol grip handle 107 extends along a line passing through the central axis 149 of tank 101. In other embodiments the pistol grip handle 107 may extend from the RAR pneumatic tire seater 100 in an orientation other than along lines from central axis 149, for example, along a line passing 3 inches to the right of the central axis 149. Typically, the orientation of the pistol grip handle 107, control cluster 109 and carry handle 115 relative to the output of nozzle 105 can be adjusted by loosening the lock nut on the nozzle assembly 105, and positioning nozzle assembly 105 in the desired orientation, and then tightening the lock nut down against the distal end of the RAR valve 103.

The embodiment depicted in FIGS. 1A-B with the pistol grip handle 107 and carry handle 115 enables a user to easily hold and manipulate the RAR pneumatic tire seater 100 while mounting a tire. Grasping the pistol grip handle 107 with one hand allows the user to rest the bottom side of tank 101 along their forearm, thus making it easy to move the RAR pneumatic tire seater 100 into position to seat a tire. The user's other hand can grasp carry handle 115, if needed.

The two RAR pneumatic tire seater embodiments 100 and 110 are both depicted in FIG. 1A with a neckdown nozzle as described below in conjunction with FIGS. 7A-B. In practice, however, the embodiments 100 and 110 and other embodiments are configured removable nozzles that may be replaced with other types of nozzles. In various embodiments a portion of the RAR pneumatic tire seater (e.g., the distal end of the RAR valve) may be configured with female threads that accept various types of nozzles. This allows the user to swap out nozzles to alter the burst characteristics of their pneumatic tire seater, thus providing a larger or smaller burst to suit a particular type of tire being mounted or desired level of pressurized air to be used in the tank. For example, any of the three nozzles depicted in FIGS. 2A-C can easily and conveniently be interchanged on the embodiments 100 and 110, as well as other embodiments of the RAR pneumatic tire seater.

Figure 2A:
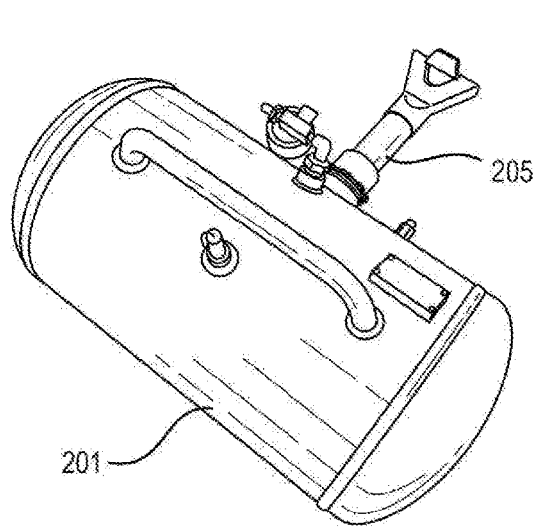
FIGS. 2A-C depict oblique views of three RAR transverse tank pneumatic tire seater embodiments.
Figure 2B:
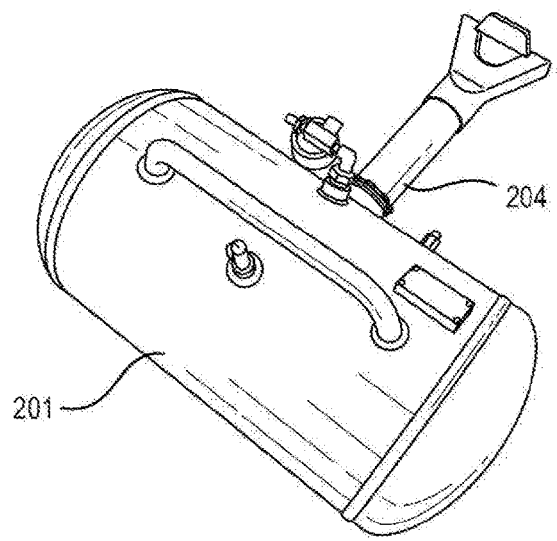
Figure 2C:
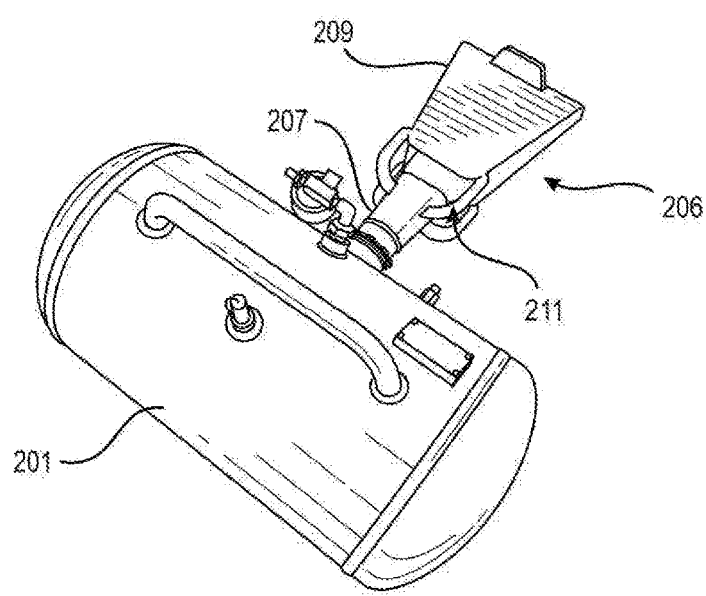

FIGS. 2A-C depict oblique views of three RAR transverse tank pneumatic tire seater embodiments. The RAR transverse tank pneumatic tire seater features a nozzle mounted transverse to the tank 201—that is, perpendicular to the central axis of cylindrical tank 201. Various embodiments of pneumatic tire seaters have an assortment of air tank sizes. The RAR transverse tank pneumatic tire seaters depicted in FIGS. 2A-C each have a 38 liter tank. The RAR pneumatic tire seater 100 shown in FIG. 1A has a 6 liter tank. The RAR pneumatic tire seater 110 shown in FIG. 1A has a 3 liter tank. Other embodiments have various sized air tanks, for example, a 12 liter tank, a 15 liter tank, a 9 liter tank, a 4 liter tank, a 3 liter tank, a 2 liter tank, a 1.9 liter tank, a 1.5 liter tank a 1.0 liter tank, a 50 liter tank and a 38 liter tank. In various embodiments the portable tanks may be any size between 50 liters and 1.0 liter. Tanks over 50 liters may be too large and unwieldy for users to carry and aim. Stationary tanks or wheeled tanks may be any size from 50 to 1500 liters, or more. The two RAR pneumatic tire seater embodiments 100 and 110 depicted in FIG. 1A each blows a stream of air that can seat a typical pickup truck tire, e.g., 2018 Goodyear Wrangler steel belted radial P235/75R15 sized tire at a temperature of 70 degrees Fahrenheit. The RAR pneumatic tire seater embodiments 100 and 110 can also seat larger sized tires such as that of an 18 wheeler truck, e.g., 11R22.5G sized tires at a temperature of 70 degrees Fahrenheit.

The tank size can be altered in various implementations to be as large or small as needed for a particular application. For example, a tank may be as large as 100 liters to as little as 0.5 liter, in 0.5 liter increments—e.g., 0.5 liter, 1.0 liter, 1.5 liter, 2.0 liter and so on up to 99.5 liter and 100.0 liter. An upper tank size of 100 liters is an arbitrary limit based on weight. Tanks larger than 100 liters could be used with the various embodiments, but they would be difficult to lift and carry. Tanks larger than 100 liters may be used if either the tank is stationary or mounted on wheels (e.g., an air compressor tank). For example, in a factory or shop setting some embodiments have no need for a portable tank such as tank 101 depicted in FIGS. 1A-B. Instead, a number of the RAR valves 103 and nozzle assemblies 105 are pneumatically connected directly to a central source of compressed air via an air hose. For example, the RAR valve 103 and nozzle assembly 105 may be attached to an air compressor having a tank size of much greater than 100 liters, e.g., tanks of 100 gallons or more. In other factory implementations a number of pneumatic tire seaters, such as RAR valve pneumatic tire seater 110 of FIG. 1A, are connected or tethered to a central source of compressed air via an air hose.

Turning again to FIGS. 2A-C, each of the three RAR transverse tank pneumatic tire seater embodiments depicted in FIGS. 2A-C features a different nozzle embodiment. The RAR transverse tank pneumatic tire seater of FIG. 2A has a neck down nozzle 205 similar to that depicted in FIGS. 1A-B. The neck down nozzle embodiment is shown in FIGS. 7A-C and described in further detail in the paragraphs below associated with those figures. FIG. 2B depicts an RAR transverse tank pneumatic tire seater embodiment with a straight through nozzle 204. The straight through nozzle 204 has a uniform inside diameter from its proximal end connected to tank 201 outward to the point where the nozzle divides into two air paths. FIG. 2C depicts an RAR transverse tank pneumatic tire seater embodiment with a cow bell nozzle assembly 206. The cow bell nozzle assembly 206 has a shaft 207 that is pinched down in a shape to direct air into the cowbell component 209. The gap 211 between shaft 207 and the cowbell component 209 allows air to be drawn into the cowbell component 209 in response to pressurized air rushing through the valve of the RAR transverse tank pneumatic tire seater and out the nozzle.

Figure 3A:
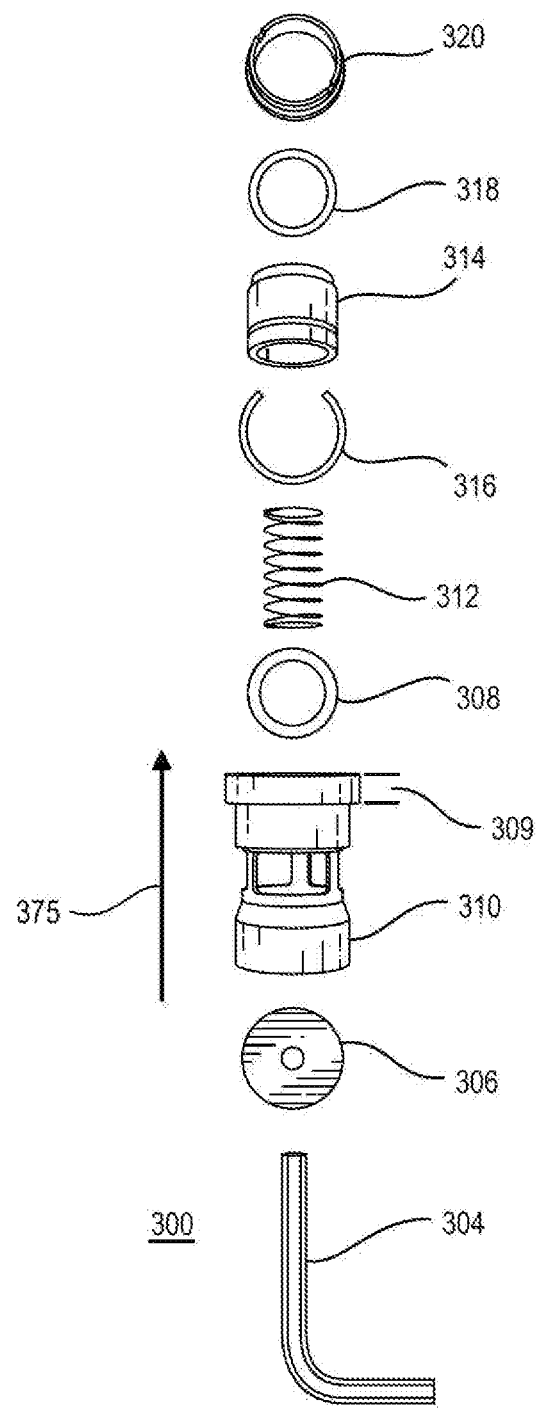
FIG. 3A-B depict exploded views of RAR valves according to various embodiments disclosed herein.

FIG. 3A depicts an exploded view of an RAR valve 300 illustrating the component parts that are configured as part of the RAR valve 300, according to various embodiments disclosed herein. The RAR valve 300 features a cylinder 310 and piston 314 that moves back and forth within the cylinder 310 from a closed position to an open position. As depicted in FIG. 3A the RAR valve 300 includes slotted lock collar 320, O-ring 318, piston 314, piston ring 316, spring 312, cushion 308, cylinder 310, endcap 306 and conduit 304.

The endcap 306 is fastened to the proximal end of cylinder 310. The cylinder 310 extends into the air tank where pressurized air is contained. The cylinder 310 includes a cylinder collar portion 309 that is positioned just outside the hole in the tank through which the cylinder 310 extends. The collar portion 309 and cylinder 310 extending into the tank can be seen in the cutaway view of FIG. 5B. In the embodiment depicted in FIG. 3A the collar portion 309 has a greater diameter than the rest of the cylinder 310. In some embodiments the collar portion 309 may have the same diameter as the adjacent portion of cylinder 310, and in other embodiments the collar portion 309 may have a smaller diameter than the adjacent portion of cylinder 310. In various embodiments the endcap 306 is welded to the cylinder 310. The piston 314 has an outside diameter that is slightly smaller than the inside diameter of the cylinder 310. The piston 314 fits within the cylinder 310, and is loose enough to slide back and forth in the cylinder with little resistance. The embodiment 300's piston 314 can be removed. However, it is difficult to get it back into the cylinder 310 without damaging the piston ring 316. In some embodiments the entire cylinder 310 can be detached (unscrewed) and removed through the front tank hole.

The spring 312, a compression spring, is positioned in a partially compressed state within the cylinder 310 between the endcap 306 and the piston 314. One end of the spring 312 pushes against the endcap 306 which is attached to cylinder 310. The other end of the spring 312 pushes against the piston 314 which is free to move back and forth within the cylinder 310 from the open position (backward in proximal direction, opposite of distal direction 375) to the closed position (forward in distal direction 375). With piston 314 in the closed position the RAR valve 300 prevents air from escaping the tank. In order to lighten the weight of piston 314 and also to provide more room for spring 312, the proximal end of piston 314 may be hollowed out to provide a receptacle at the back of piston 314. For example, in some embodiments the proximal end of piston 314 is hollowed out to within approximately 0.5 inches of its distal end. This provides a hole in the back of the piston 314 that the spring 312 fits into. Hollowing out and reducing the weight of the piston 314 has the added benefit of decreasing the force of the piston 314 slamming into the back of the cylinder (e.g., endcap 306 of FIG. 3A). The lighter weight piston 314 decreases wear and tear on the valve as the piston 314 repeatedly slams to the back of the cylinder in the fully open position.

With the air tank empty the spring 312 tends to push the piston 314 in the distal direction 375 to the closed position—that is, to close the valve 300. Direction 375 is called the distal direction because, upon opening the RAR valve 300, the pressurized air blows outward away from the user in the distal direction 375. The force exerted by the spring 312 has an effect on the operation of the various RAR valve embodiments. The spring must have a sufficient spring rate—that is, produce a sufficient force—to close the RAR valve with the tank empty. A higher spring rate also aids in reducing the force with which the piston hits the endcap 306 as the piston slams to its open position as compared to a spring characterized by a lower spring rate. Another consideration is that, over time impurities from impure air pumped into the tank could possibly build up on the internal parts of the RAR valve, thus resulting in friction on the piston as it moves back and forth in the cylinder. A stiffer spring with a higher spring rate is able to overcome a certain amount of friction in the cylinder due to the build-up of impurities, making it less susceptible to malfunctions. However, not all the characteristics of a high spring rate spring are beneficial to the RAR valve. The higher the spring rate, the more force it takes to open the valve. A spring having too high of a spring rate will tend to make the RAR valve open more slowly, or not at all, as compared to a spring with just enough spring rate to push the piston to the closed position when the air tank is empty. Thus, the choice of spring rate involves a trade-off between the speed at which the RAR valve opens and reliability of the RAR valve.

Figure 5A:
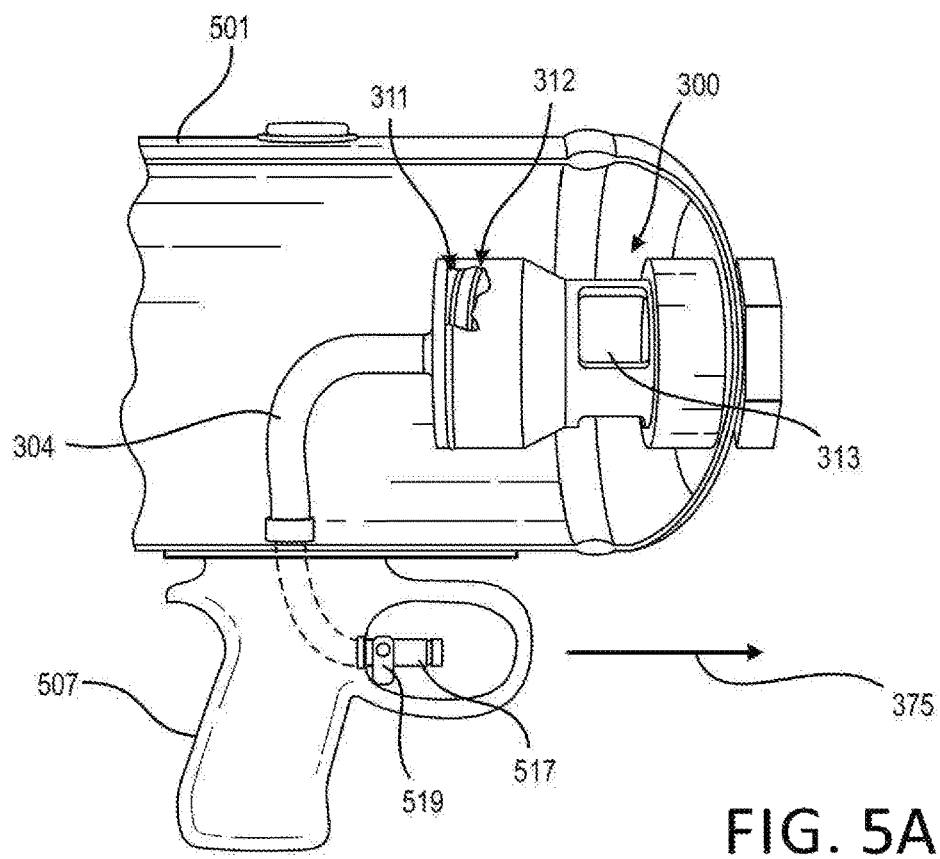
FIGS. 5A-B depict side views of an RAR pneumatic tire seater with a portion of the tank cut away to display the RAR valve inside the tank according to various embodiments disclosed herein.
Figure 5B:
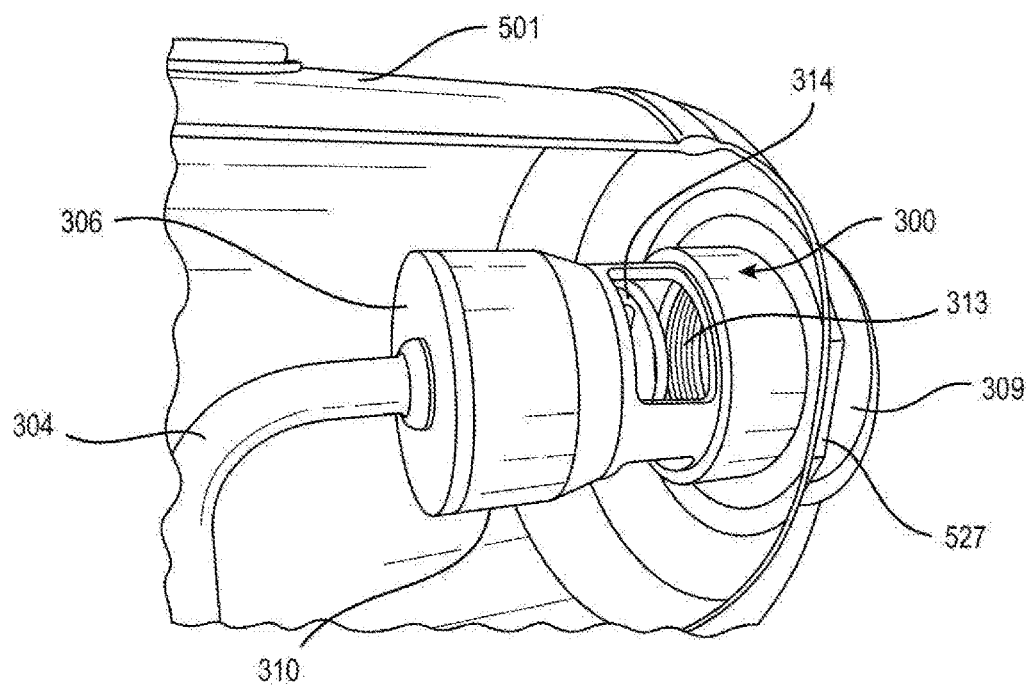

The spring 312 shown in FIG. 3A for a 2 inch RAR valve has an outside diameter of slightly less than 1.375 inches and is approximately 3.0 inches long in its uncompressed state. The spring 312 is slightly smaller than the inside diameter of the cushion 308 so that it can be placed against the endcap 306 with the cushion 308 fitting snuggly around it. The cushion 308 aids in cushioning the piston 314 as it slams back towards the endcap 306 in response to the RAR valve 300 opening. Turning to FIGS. 5A-B, these figures illustrate the piston 314 pushed back to an open state. With the tank 501 empty and piston 314 closed it takes a certain amount of force applied to the distal end of the piston 314 to begin opening the piston 314—that is, to push the piston 314 away from the point where it is seated inside the cylinder 310. The force required to begin opening the RAR valve by pushing on the piston 314 in its seated position is called the "closed-state spring force." Some embodiments have a closed-state spring force that is within the range of 0.1 ounce to 10 lbs. Various embodiments have an empty tank spring force within a number of different ranges, including the range of 0.1 ounce to 7 lbs., the range of 0.1 ounce to 5 lbs., the range of 0.1 ounce to 4 lbs., the range of 0.1 ounce to 3 lbs., the range of 0.1 ounce to 2 lbs., the range of 0.1 ounce to 1 lb., the range of 0.05 ounce to 8.0 ounces, and the range of 0.05 ounce to 4.0 ounces.

A slotted lock collar 320 as shown in FIG. 3A screws into the female threaded end of cylinder 310. The slots aid in screwing and unscrewing the slotted lock collar 320. The female threaded end of cylinder 310 that the slotted lock collar 320 screws into can be more clearly seen in FIG. 3D just above the air input holes around the sides of cylinder 310. In at least some embodiments the female threads for the slotted lock collar 320 are finer than the female threads for the nozzle near the output of the cylinder 310. The slotted lock collar 320 has an inside diameter that is smaller than the diameter of the piston 314, thus preventing the piston 314 from coming out the distal end of cylinder 310. The piston 314 as depicted in FIG. 3A is configured to receive a distal O-ring 318 around its distal end. In the closed position, the distal O-ring 318 seats against the surface of the slotted lock collar 320 opposite the slotted surface. The distal O-ring 318 aids in maintaining an airtight seal while the valve remains in the closed position. In other embodiments the O-ring is mounted on the inside of the RAR valve opening, and the piston 314 slides forward to the closed position, coming in contact with the O-ring to form an airtight seal.

At the proximal end (back end) of the RAR valve 300 a conduit 304 is fastened between the hole on the endcap 306 shown in FIG. 3A and a hole in the tank of the pneumatic tire seater, e.g., tank 101 of pneumatic tire seater 100 depicted in FIG. 1A. A valve control mechanism controllably opens/closes to controllably connect/disconnect a control chamber in the cylinder 310 between the piston 314 and endcap 306 to the outside atmosphere via conduit 304. The valve control mechanism (e.g., 517 depicted in FIG. 5A) serves as a switch for the RAR valve to open the valve and release a blast of air from the tank. Further details of the RAR valve may be seen in FIGS. 5A-B.

Figure 3B:
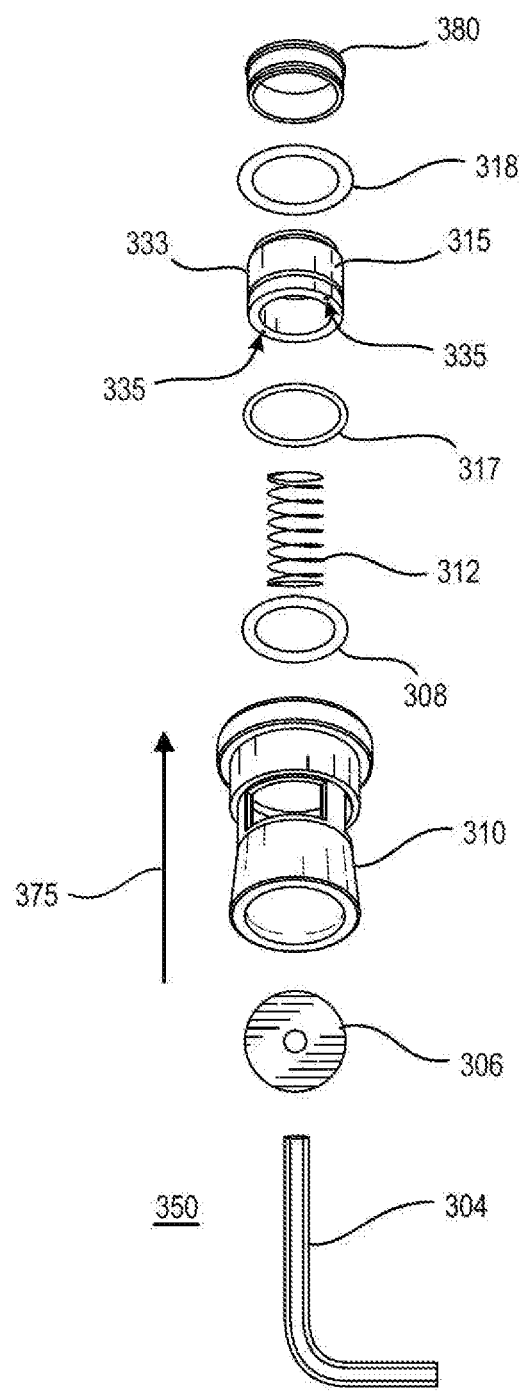

FIG. 3B depicts an exploded view of an RAR valve 350 illustrating component parts, according to various embodiments disclosed herein. This embodiment 350 has the same basic components as embodiment 300 depicted in FIG. 3A—except for differences in the piston ring, the piston and the lock collar. Embodiment 350 as depicted in FIG. 3B includes lock collar 380, a distal O-ring 318, a piston 315, a proximal O-ring 317, a spring 312, a cushion 308, and a cylinder 310, an endcap 306 and a conduit 304. Note that the embodiment 350 lacks a piston ring 316 of embodiment 300, and instead has a proximal O-ring 317. One advantage of the embodiment 350 which doesn't have a piston ring 316 is that the piston 315 can be more easily removed through the front of the cylinder 310 for cleaning or repair, and then reassembled. Two embodiments for the lock collar 380 are discussed below in conjunction with FIGS. 4A-E.

The embodiment 350 has a proximal O-ring 317 on the piston 315 instead of having a piston ring 316 like embodiment 300. The piston 315 of FIG. 3B has an O-ring trough 333 configured to accept the proximal O-ring 317. The O-ring trough 333 is shallow enough to push the proximal O-ring 317 outward against the inner wall of cylinder 310. The O-ring trough 333 may be positioned around piston 315 anywhere along its length. However, in at least some implementations the O-ring trough 333 is positioned away from the proximal end of piston 315 approximately ¼ inch (that is, ¼ inch in the distal direction 375 away from the proximal end of piston 315). The control gas holes 335 pass from the proximal end of piston 315 to the O-ring trough 333.

The control chamber 311 is the area between the proximal end of piston 315 and endcap 306 and includes any hollowed out portion of piston 315 (that is, hollowed out from the piston 315's proximal end). The control chamber 311 with the piston in the closed position is indicated by the dotted lines on FIG. 3E. The control gas holes 335 on piston 315 of FIG. 3B serve as a means for filling the control chamber 311 (shown in FIG. 3E) by providing for constrained pneumatic communication between the air tank and the control chamber 311. The control gas holes 335 allow high pressure air from within the tank (e.g., tank 101) to pass past the piston 315 into control chamber 311 (sometimes called control reservoir). The piston 315, with proximal O-ring 317 fitted around it but without control gas holes 335, would tend to prevent high pressure gas from the tank from passing into the control chamber 311. The control gas holes 335 allow the pressurized air to bleed past the piston 315 as tank is being filled at a rate fast enough to keep the pressure in the control chamber 311 relatively close to the pressure within tank. The pressure in control chamber 311 in combination with the force of spring 312 keep the valve 350 closed while the tank is being filled with pressurized gas (e.g., pressurized air).

Various embodiments may have more than two control gas holes 335. For example, the RAR valve with three or more control gas holes 335 spread equidistance around the back of the piston. The RAR valve can be implemented with only one control gas hole 335, but this unbalanced implementation causes the piston 315 to shimmy slightly as it is pushed back into the open position. The two control gas holes 335 are approximately 0.25 inch long and 0.08 inch (2 mm) in diameter. In other embodiments more control gas holes 335 the holes are spread symmetrically around the proximal side of piston 315 and have approximately the same total gas flow capacity as the two control gas holes 335 mentioned above that are approximately 0.25 inch long and 0.08 inch (2 mm) in diameter. In some implementations the control gas holes 335 may pass from the O-ring trough 333 to the side of the piston 315 near its proximal end—that is, in the space between the piston 315 and the adjacent cylinder wall. In these embodiments the side of the piston may itself have a small trough or groove on its side from the control gas holes 335 to the proximal end. In yet other implementations the control gas holes 335 may pass from the O-ring trough 333 to inside the hollowed out portion at the proximal end of the piston 315. In other embodiments the control gas holes 335 may pass from just ahead of the O-ring trough 333 to one of the aforementioned spots behind the O-ring trough 333. In all such implementations the control gas holes 335 are considered to pass to the proximal end of the piston 315 since they put the pressurized air within the tank in constrained pneumatic communication with the control chamber 311.

Figure 3C:
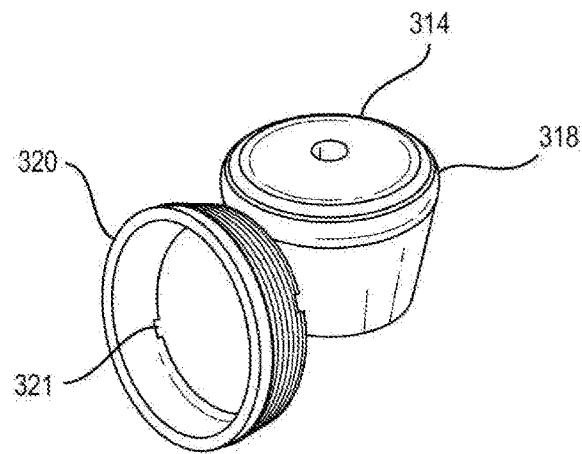
FIG. 3C depicts an oblique view of a piston, a distal O-ring and a slotted lock collar of an RAR valve according to various embodiments disclosed herein.

FIG. 3C depicts an oblique view of a piston 314, a distal O-ring 318 and a slotted lock collar 320 of an RAR valve 300. This view shows the male threads on slotted lock collar 320 that fit into the female threads of cylinder 310 shown in FIG. 3C to hold the piston 314 (or piston 315) in place within cylinder 310. The slots 321 of slotted lock collar 320 enable a tool to be used to remove the slotted lock collar 320 and disassemble the RAR valve 300. Upon the slotted lock collar 320 being assembled within the RAR valve 300, the slots 321 face outward in the distal direction 375. The inner edge of slotted lock collar 320 opposite the slots 321 depicted in FIG. 3C is the surface that opposes the piston 314 (or piston 315) in the closed position. The RAR valve 300 closes to seal air within the air tank by seating a flexible sealing component onto a hard surface. In various embodiments the distal O-ring 318 serves as the flexible sealing component. The distal O-ring 318 mounted on piston 314/315 seats against the inner edge of slotted lock collar 320 with the RAR valve 300 in the closed position. The closed position is air tight because the flexible sealing component—e.g., the O-ring 318—is forced against the hard smooth surface of the slotted lock collar 320, flattening the O-ring 318 to some extent and providing an air tight seal. In other embodiments the flexible sealing surface may be mounted on the RAR cylinder 310 itself (e.g., an O-ring), with a flat smooth surface provided on the piston to mate against it and provide an air tight seal.

Figure 3D:
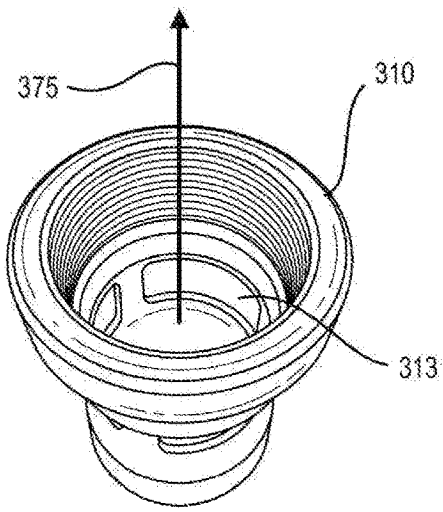
FIG. 3D depicts an oblique view from the distal end of an RAR valve cylinder component according to various embodiments disclosed herein.
Figure 3E:
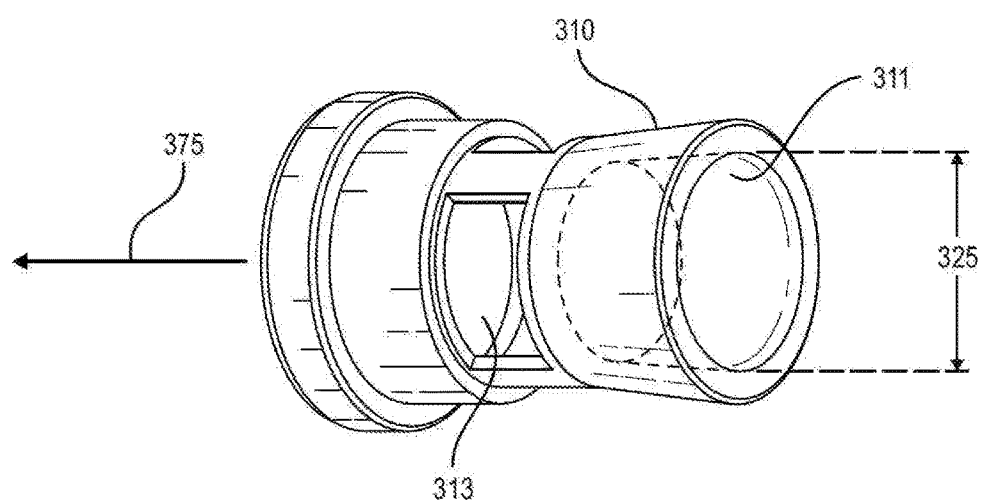
FIG. 3E depicts an oblique view from the side of an RAR valve cylinder component according to various embodiments disclosed herein.

FIG. 3E depicts an oblique view from the side of an RAR valve cylinder 310 according to various embodiments disclosed herein. The dotted line of FIG. 3E depict the control chamber 311 between the piston 314 (or 315) and the end cap 306, with the piston in the closed position. The cushion 308 is contained within the control chamber 311 along with spring 312. Hence, the air volume of control chamber 311 in the closed position is reduced by the volume of the cushion 308 and the spring 312.

Diameter 325 is the inside diameter of cylinder 310. The various RAR valve embodiments are defined by a number of parameters, including for example, the valve diameter, the piston stroke length, the closed position control chamber volume, cylinder side-hole area. RAR valves are often characterized in terms of the valve diameter since this parameter contributes greatly to the volume of air burst produced by the valve. RAR valves are implemented in a wide range of valve diameters, e.g. from 0.25 inch to 20 inches or more. Two typical sizes are the 1.5 inch RAR valve and the 2.0 inch RAR valve. The 1.5 inch RAR valve produces a burst of air that is easily sufficient to mount an 18 wheeler truck, e.g., 11R22.5G sized tire. The 2.0 inch RAR valve produces a substantially greater burst of air than the 1.5 inch RAR valve.

Figure 4A:
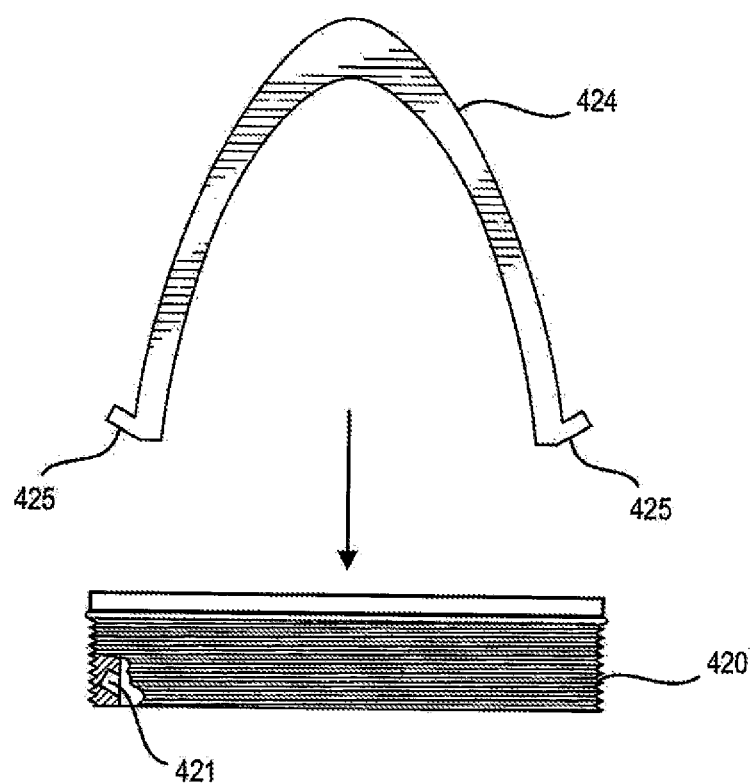
FIG. 4A depicts a cutaway side view of a proprietary lock collar with inner removal holes and a proprietary tool for removing and replacing the proprietary lock collar.

FIG. 4A depicts a cutaway side view of a proprietary lock collar 420 according to various embodiments. The proprietary lock collar 420 is interchangeable with lock collars 320 and 380 of FIGS. 3A-C. The proprietary lock collar 420 is configured to screw into the female threaded end of cylinder 310. The female threads of cylinder 310 may be seen in FIG. 3D. The contoured holes 421 aid in screwing and unscrewing the proprietary lock collar 420 to remove the internal parts of the RAR valve, e.g., the piston, spring, cushion, etc. The inside diameter of proprietary lock collar 420 is smaller than the diameter of the piston 314 (or piston 315), thus retaining the piston 314 within end of cylinder 310. In the closed position, the distal O-ring 318 seats against the surface of the proprietary lock collar 420, providing an air-tight seal with the RAR valve in the closed position.

Proprietary tool 424 is configured for removing and replacing the proprietary lock collar 420. The proprietary tool 424 shown in the figure is embodied as a single piece of flexible, hardened material such as spring steel. In other embodiments the proprietary tool 424 may be implemented as a tool consisting two or more pieces designed to hinge in the manner of a pair of pliers. The proprietary tool 424 has two contoured feet 425 configured to fit into contoured holes 421 on the inner surface of the proprietary lock collar 420. A user may insert the proprietary tool 424 for removal of the proprietary lock collar 420 by squeezing the legs together, positioning the contoured feet 425 over the contoured holes 421, then sliding the tool 424 slightly outward to seat the feet 425. In some embodiments the contoured feet 425 may be skewed slightly left and right as seen from looking from above (i.e., one skewed left and the other skewed right). The contoured holes 421 are skewed to match the skewed contoured feet 425. Skewing the feet 425 and holes 421 helps to seat the proprietary tool 424 and prevent it from slipping out of position as the proprietary lock collar 420 is being removed.

Figure 4B:
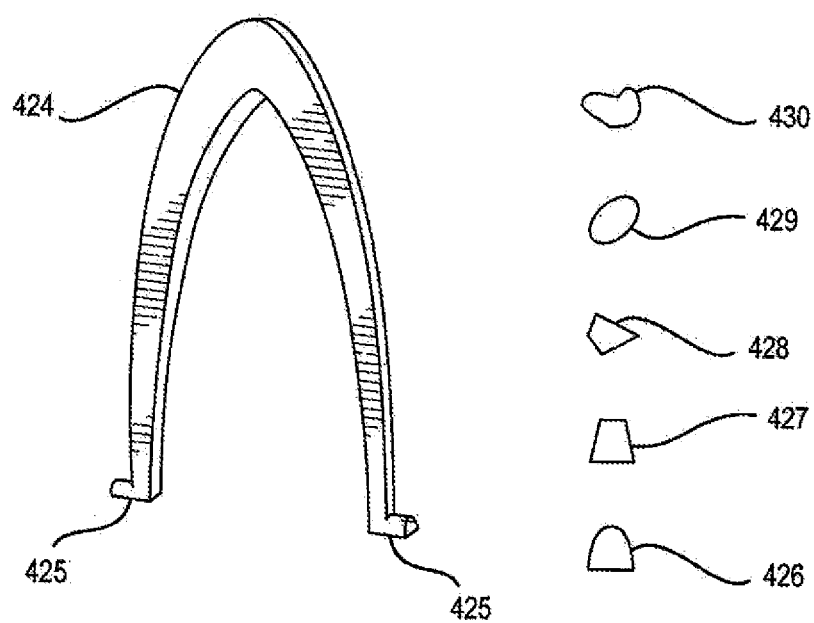
FIG. 4B depicts the proprietary tool and the cross-sectional shapes of the tool's feet according to various embodiments disclosed herein.

The contoured feet 425 may have a contoured cross-section in a shape other than round or rectangular, as shown in FIG. 4B. For example, the contoured feet 425 may be implemented with a horseshoe cross-section 426, a symmetrical polygon 427 (e.g., trapezoid), a non-symmetrical polygon 428, an oval 429 (e.g., an ellipse), a non-symmetrical shape 430 or other like shape as are known to those of ordinary skill in the art. The contoured shape of holes 421 aid in maintaining a grip between the contoured feet 425 and contoured holes 421 as the proprietary lock collar 420 is being loosened or tightened.

Figure 4D:
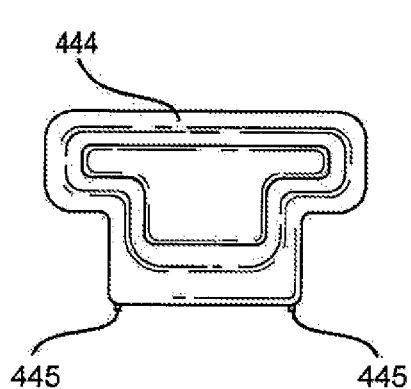
FIG. 4D depicts a tool for removing and replacing the lock collar.
Figure 4C:
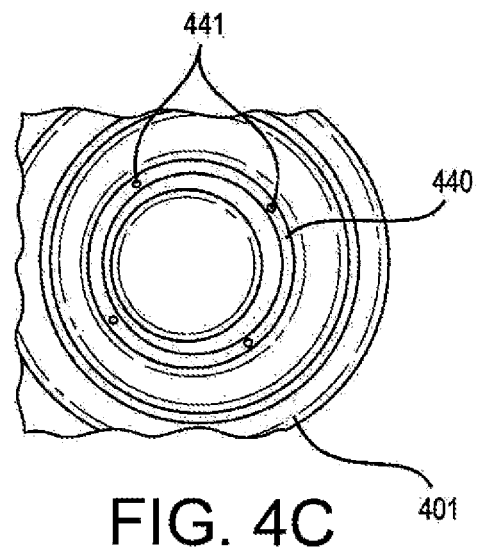
FIG. 4C depicts a lock collar with removal holes on the outer face.
Figure 4E:
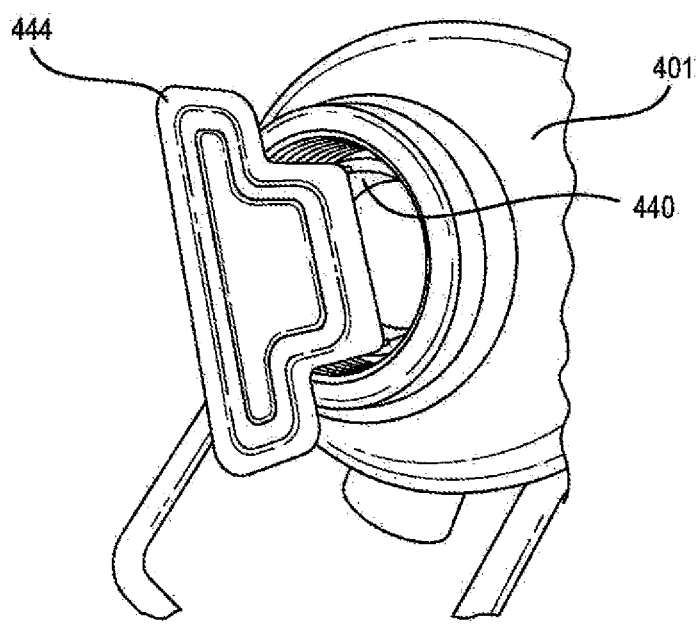
FIG. 4E depicts an oblique view of the tool inserted into the lock collar, according to various embodiments disclosed herein.

FIG. 4C depicts a lock collar 440 with removal holes 441 on the distal face and a tool 444 for removing and replacing the lock collar 440 according to various embodiments disclosed herein. The tool 444 has pegs 445 configured to fit into removal holes 441 for tightening and loosening the lock collar 440. FIG. 4D depicts tool 444 having two pegs 445. In other implementations the tool 444 may have three or more pegs. FIG. 4C also depicts two pairs of holes 441 positioned diametrically across from each other on the distal surface of lock collar 440. In other implementations the two or more holes 441 may be positioned in a non-symmetrical manner around the distal surface of lock collar 440. In one embodiment a single removal hole 441 is provided, and the tool 444 is configured with a round portion that is inserted a short distance into the air passage of lock collar 440 before the peg 445, positioned to the side of the round portion, is received in hole 441. FIG. 4E depicts an oblique perspective of a tank 401 with the nozzle removed. The tool 444 is shown inserted into removal holes 441 to allow a user to tighten (or loosen) the lock collar 440.

FIGS. 5A-B depict side views of an RAR pneumatic tire seater with a portion of the tank cut away to display the RAR valve inside the tank according to various embodiments disclosed herein. The RAR valve in each of these views is pushed back and held in the open position to reveal the distal end (forward end) of piston 314. For the sake of consistency FIGS. 5A-B use the reference numbers from FIGS. 3A-C to identify components of the RAR valve as depicted in FIGS. 3A-F.

In the embodiments depicted in FIGS. 5A-B a portion of the RAR valve extends through a hole in the air tank 501 into its interior where the pressurized air is contained. In the embodiments depicted, another small portion of the RAR valve extends out of the hole in tank 501 to the atmosphere outside the tank. In various embodiments the cylinder 310 of the RAR valve is welded to the tank 501 to affix it in an airtight manner. The bead of weld 527 connecting the two components can be seen in FIG. 5B. In other embodiments the RAR valve is threaded on an outside surface and screws into the tank 501, allowing it to be removed for repair or replacement, and to enable access to the inside of the tank 501.

The valve control mechanism 517 shown in FIG. 5A serves as a switch for the RAR valve 300 to open the valve and release a blast of air. Various other embodiments may be configured with different types of valve switch components, including for example, a lever, a button, a toggle, a switch, a rotating collar, a bar, a trigger mechanism, and other such valve switch components as are known by those of ordinary skill in the art. In various embodiments the valve control mechanism 517 may be protected by a trigger guard to avoid inadvertently opening the valve 300 and releasing a blast of air from the tank 501.

The cylinder 310 is configured with one or more air vents 313 that open into the interior of the tank 501. In the RAR valve's closed position the piston 314 with its distal O-ring 318 is pushed forward in the distal direction 375 to seat against the slotted lock collar 320 (or proprietary lock collar 420 of FIG. 4A) and prevent pressurized air within the tank 501 from exiting into the atmosphere. The RAR valve is in the open position with the piston 314 with its distal O-ring 318 pulled back in the proximal direction to unseat from the slotted lock collar 320 and allow pressurized air from the tank 501 to escape through the nozzle 105. There is a space within the cylinder 310 between the piston 314 and the endcap 306 called a control chamber 311 as shown in a cutaway view in FIG. 5A. The spring 312 and cushion 308 are contained within the control chamber 311. The spring 312 act by itself typically has sufficient force to push the piston to the closed position if the tank has little or no pressure in it (e.g., after the RAR valve has been discharged, emptying the tank). As the tank is filled with pressurized air, the air pressure within the control chamber 311 in conjunction with the force of spring 312 act to keep the piston 314 in the closed position, that is, pushed forward towards in distal direction 375.

The force of spring 312 is sufficient to move the piston 314 (or piston 315) to the closed position if the tank 501 has little or no pressurized air in it, e.g., immediately following discharge of the RAR valve 300. However, the force of spring 312 alone isn't enough to keep the RAR valve 300 closed as it is filled with pressurized air. Instead, the combined force of spring 312 in conjunction with the air pressure in the control chamber 311 keeps the RAR valve 300 in the closed position, so long as the pressure within the control chamber 311 remains within a predetermined percentage of pressurized air in the tank. The predetermined percentage depends on the spring rate (stiffness) of the spring 312. A spring with a relatively higher spring rate (more stiff) requires more of a drop in the pressure of the control chamber 311 in order to pull the piston 314 back from its closed state to an open state, as compared to a spring 312 with a spring rate just high enough to close the piston 314 with the tank 501 nearly empty (i.e., less than 5 psi of air pressure).

The air pressure in control chamber 311 comes from pressurized air bleeding past the piston 314 as the tank 501 is filled with pressurized air. Once the pressurized air bleeds past the piston into the control chamber it's called control gas. In various embodiments a piston ring 316 may be provided on the piston 314 to aid in providing a better seal between the piston 314 and the inner walls of cylinder 310, thus controlling the rate at which the pressurized air in tank 501 leaks past the piston 314. Typically, the piston ring 316 is seated within an O-ring trough that runs around the piston 314. In some embodiments the O-ring trough is located approximately 0.5 inch from the proximal end of piston 314. The piston ring 316 may be a spring steel piston ring (or other like type of rigid material), or may be a proximal O-ring. The piston ring 316 of the 300 embodiment depicted in FIG. 3A is purposefully provided with a gap to allow some air to bleed past the piston into control chamber 311. Even though the piston 314, equipped with a piston ring 316, and fits snuggly within the cylinder 310, the pressurized air bleeds past the piston 314 at a rate fast enough as tank 501 is being filled to keep the pressure in the control chamber 311 relatively close to the pressure within tank 501. Similarly, the piston 315 of the 350 embodiment depicted in FIG. 3B is provided with one or more holes 335 that bleed pressurized air into the control chamber 311 as the tank is being filled. The gap in piston ring 316 and the holes 335 in piston 315 both serve as a means for filling the control chamber 311, and as such, may both be referred to as control gas passageways since pressurized air from the tank's interior bleeds past the piston 314/315 into the control chamber 311 to become control gas. For example, if an air compressor with 150 psi air in an 80 gallon tank is used to fill the tank 501, the pressure within control chamber 311 remains within 95% of the air pressure in tank 501 as it is being filled. That is, the pressure within control chamber 311 mirrors the air pressure in tank 501 as it is being filled by remaining within no less than 95% of the pressure in tank 501. Once the tank 501 is full the pressure in the control chamber 311 equalizes with the pressure in tank 501 in just a few seconds—say, within no more than 5 seconds.

The air in the control chamber 311, for the purposes of this disclosure, is called "control gas" (or "control air"). This is significant inasmuch as the pressurized air in the air tank vents out through the nozzle in response to the RAR valve being opened. By contrast, nearly all of the control gas vents out through the conduit 304 and control valve 519 shown in FIG. 5A. As discussed above, the source of the control gas is pressurized air leaking past the piston 314 as the tank 501 is being filled. The control chamber 311 is pneumatically coupled to the atmosphere (outside of the tank 501) via conduit 304 and control valve 519. The control valve 519 prevents the control air from escaping from control chamber 311 until the valve control mechanism 517 is actuated (e.g., depressed). Actuating the valve control mechanism 517 opens the path between the control chamber 311 and the atmosphere outside the tank 501 via conduit 304, allowing the control gas in the control chamber 311 to freely release into the atmosphere outside the tank 501. The control gas being released from control chamber 311 reduces the air pressure in the control chamber 311 that is helping to keep the piston 314 pushed forward in the closed position. As a result of the control gas being released the force of compression spring 312 is no longer sufficient to maintain the valve 300 in the closed position, and the piston 314 begins to pull back in the proximal direction. As the RAR valve 300 begins to open the pressurized air from tank 501 rushing past the piston 314 aids in opening the piston 314 to the fully open position.

FIG. 5A shows the conduit 304 connects to an inlet of control valve 519. The control valve 519 is configured to vent the control gas near the control mechanism 517. In other embodiments the control valve 519 may be configured with an outlet that vents air out the bottom of pistol grip 507, or out of the top of grip 507 between the tank 501 and the grip 507. The volume of control gas released from the control chamber 311 in response to opening the RAR valve 300 is not very large in comparison to the air that vents through the nozzle from air tank 501. Various embodiments release an amount from 15 to 50 cubic centimeters of control gas, depending upon the inside diameter of cylinder 310, the size of piston 314 and extent to which it is hollowed out, and the stroke of piston 314 (that is, the distance the piston 314 travels back in the cylinder 310 upon opening the valve). The piston stroke is approximately 0.5 inches, but depending upon the size of the valve and parameters of the implementation, may be as short as 0.10 inch to as great as 2.5 inches, or any length or range within 0.10 inch to 2.5 inches. In some of the larger embodiments the piston stroke may even be greater than 2.5 inches. Larger embodiments of RAR valves release more control gas—an amount that is somewhat less than the volume of the piston 314.

The various RAR gas valve embodiments disclosed herein, including the RAR gas valve 300 of FIGS. 5A-B, are two-state open/close gas valves. As such, they are fully closed while holding a pressurized tank of air, before actuating the valve control mechanism 517, and switch to a fully open state in response to actuating the valve control mechanism 517. The gas valves used on conventional bead seating devices are multi-state adjustable gas valves—that is, they may be set at fully closed, partially opened, or fully open. The operation of a conventional bead seating device depends largely on how quickly a user can open its multi-state adjustable gas valve. The various RAR gas valve embodiments disclosed herein are two-state open/close gas valves which open much more quickly than a human user could possibly open a conventional gas valve. The rapid opening time aids in seating a tire on a rim. The two-state open/close gas valves disclosed herein are similar to a gun (e.g., a pistol, rifle or shotgun) inasmuch as a gun doesn't file a bullet at a faster speed (e.g., feet per second) because the user pulls faster or harder on the trigger. The bullet travels out of the gun's muzzle at the same feet-per-second rate regardless of how quickly the user manipulates the trigger mechanism. Similarly, the two-state open/close RAR gas valve embodiments disclosed herein open at the same rate regardless of how quickly the user actuates its valve switch component—e.g., valve control mechanism 517 shown in FIGS. 5A-B.

The valve opening time at which various RAR valve embodiments opens is dependent upon a number of factors, including for example, the tightness of the piston 314 (and piston ring 316, if so equipped) within the cylinder 310, the diameter of the cylinder outlet (e.g., inside diameter of slotted lock collar 320), the air pressure in the tank, and the spring rate of spring 312. For the purpose of measuring the valve opening time, the valve begins to open as soon as the piston has traveled back 1/50th of an inch and pressurized air begins passing out the front of the cylinder. Also, for the purpose of measuring the valve opening time, the valve is considered "open" as soon as it reaches 75% of the fully open position—that is, by the time the piston reaches 75% of the total distance it is capable of traveling in the proximal direction. By this time—that is, by the time the piston has traveled 75% of the way back—a great volume of air is already passing out of the valve. For all practical purposes the valve is to be considered open at this point. Thus, the valve opening time is the time it takes from when the valve begins to open and the piston has traveled back 1/50th of an inch to when the piston has traveled 75% of the total distance it is capable of traveling in the proximal direction within the cylinder.

Various embodiments are characterized by different opening times for a tank inflated to 110+/−10 psi, including but not limited to opening times having ranges of: no greater than 10 ms (milliseconds), no greater than 20 ms, no greater than 30 ms, no greater than 40 ms, no greater than 50 ms, no greater than 60 ms, no greater than 70 ms, no greater than 80 ms, no greater than 85 ms, no greater than 90 ms, no greater than 100 ms, no greater than 120 ms, no greater than 140 ms, no greater than 150 ms, no greater than 160 ms, no greater than 180 ms, no greater than 200 ms, no greater than 225 ms, or no greater than 250 ms. The various opening times are measured with the air in the tank being at 70 degrees Fahrenheit prior to being released from the tank.

FIGS. 6A-B respectively depict a side view and a top view of an RAR pneumatic tire seater to illustrate aspects of the control cluster, according to various embodiments disclosed herein. The control cluster provides access to the interior of air tank 601 through a single access inlet. This eliminates the need for separate inlets for filling, releasing air (safety valve) and measuring the pressure inside the tank 601. The control cluster typically has a multi-connection air manifold (called a control manifold) configured to accept two or more devices. For example, control cluster 609 has a three-way air manifold to which are attached a pressure gauge 655, an inlet valve 657, and a relief valve 659. The control manifold—for example, the three-way air manifold of FIGS. 6A-B—typically has a male threaded connector fitting on the bottom configured to screw into a female threaded access inlet in air tank 601. The control manifold also typically has two or more female connectors configured to accept devices such as the pressure gauge 655, the inlet valve 657 and/or the relief valve 659 of control cluster 609 depicted in FIGS. 6A-B.

The pressure gauge 655 indicates the pressure within air tank 601. The embodiment depicted in the figures features an analog pressure gauge 655. Other embodiments have a digital pressure gauge. The air tank 601 is filled from a source of high pressure air via the inlet valve 657. The inlet valve 657 has a valve control lever (or other mechanism), and a female pneumatic coupler. Other embodiments feature a female pneumatic coupler that closes automatically upon removing the source of high pressure air. Using this type of automatic female pneumatic coupler eliminates the need for an inlet valve control. Various embodiments may be filled with a hand operated tire pump (bicycle pump) in lieu of using an air compressor. This is beneficial in locations that lack an air compressor or the electrical power needed for an air compressor.

The relief valve 659 prevents an unsafe high pressure from being put into the tank 601 or allowed to build up. The relief valve 659 is designed to open at a predetermined set pressure to protect the air tank 601 from being subjected to pressures that exceed their design limits. In some embodiments the relief valve 659 is adjustable to raise or lower the set pressure value, so as to allow a user or technician to set the limit at a level appropriate for the tank 601. In other embodiments the relief valve 659 is not adjustable, being permanently set at the factory or purchased having a predetermined set pressure value.

Configuring the control cluster 609 on the top of the tank 601 eliminates the need for separate inlets for filling, releasing air (safety valve) and measuring the pressure inside the tank 601, thus avoiding the need for an inlet on the front of the tank. Not having an inlet on the front of the tank allows a relatively larger RAR valve to be used with smaller profile air tanks. This can be quantified using a valve/tank ratio. For example, the 4 inch diameter tank with the control cluster 609 moved to the top can be fitted with an RAR valve having an overall outside diameter 3 inches, as measured by the diameter of the collar portion of the valve. However, the collar portion of a valve can easily be made larger. Therefore, it is preferable to use the inside cylinder diameter (slightly larger than the diameter of the piston) for the valve/tank ratio. The valve/tank ratio is defined as the diameter of the RAR valve as measured by the inside cylinder diameter divided by the outside diameter of the air tank (for tanks having a round cross-section). For tanks with a cross-section that is other than round, the smallest cross-sectional diameter of the tank near the valve is taken as a parameter in place of the round-tank outside diameter. Turning to FIG. 6A, the Valve Diameter is shown as $D_V$ 681. The Tank Diameter is shown in FIG. 6A as $D_T$ 683. The valve/tank ratio is illustrated as Valve Diameter $D_V$ 681 divided by Tank Diameter $D_T$ 683. The valve/tank ratio of a 2 inch valve mounted on a 4 inch tank is 50%. Various embodiments are implemented with a valve/tank ratio that falls within one or more of the following ranges: equal or greater than 50%; equal or greater than 45%; equal or greater than 40%; equal or greater than 35%; equal or greater than 30%; or any range equal or greater than any given percentage value of from 30% to 50%.

FIG. 6A depicts a side view of the pneumatic tire seater 600 showing a clearance line 661. The clearance line 661 of the tank 601 and the carry handle 615 is defined as a line between the points on the back of tank 601 and the carry handle 615 that sit on a planer surface when the pneumatic tire seater 100 is set upside down as in FIG. 1B. Clearance line 661 indicates how much room there is for the control cluster 609 beneath the level of carry handle 615. So long as the control cluster 609 is beneath the clearance line 661 between the tank 601 and the carry handle 615, the control cluster 609 won't be damaged by setting it upside down on a planar floor, table, bench, or other flat surface. Previous implementations of the pneumatic tire seater featured one or more devices mounted on the front of the tank, e.g., the pressure gauge, the inlet valve or the relief valve. Using a three-way control cluster 609 enables all three of the devices to be positioned on top of the tank, that is, the pressure gauge 655, the inlet valve 657 and the relief valve 659 are all mounted on control cluster 609. Including all three devices on the three-way control cluster 609 avoids the need to have a hole on the front of the tank, thus allowing use of a larger RAR valve as compared to the diameter of the tank. For example, the RAR valve pneumatic tire seater 110 depicted in FIG. 1A features a 2 inch valve mounted on a 3 liter tank with a diameter of approximately 4 inches. This would not have been possible with one of the devices mounted on the front of the tank beside the nozzle assembly 105.

Since these three devices are mounted in the area under clearance line 661 they are somewhat protected from damage as the tire seater is set upside down on carry handle 615 or laid flat on a table or countertop. Of these three devices, the pressure gauge 655 is most susceptible to damage. Therefore, the pressure gauge 655 is typically positioned closest to the carry handle so as to be protected if the tire seater is rolled over on a flat countertop.

FIG. 6B shows the flat portion 663 of carry handle 615 that is configured to sit on a floor, table or other planar surface. The length of the flat portion 663 is typically approximately 3.5 inches in length. In different embodiments the length of the flat portion 663 may be: 1 inch or greater: 2 inches or greater; 2.5 inches or greater; 3 inches or greater or 4 inches or greater. In addition to each of these ranges with no upper limit, are ranges with a same lower limit and an upper limit based on the diameter of the tank 601 plus 20%. For example, a tank 601 may be implemented in many different diameters, including a diameter of 5 inches. (5 inches plus 20% is 6 inches.) The ranges of diameter having an upper limit of 6 inches for a tank 601 include ranges of 2 to 6 inches; 2.5 to 6 inches; 3 inches to 6 inches or 4 inches to 6 inches.

Figure 7A:
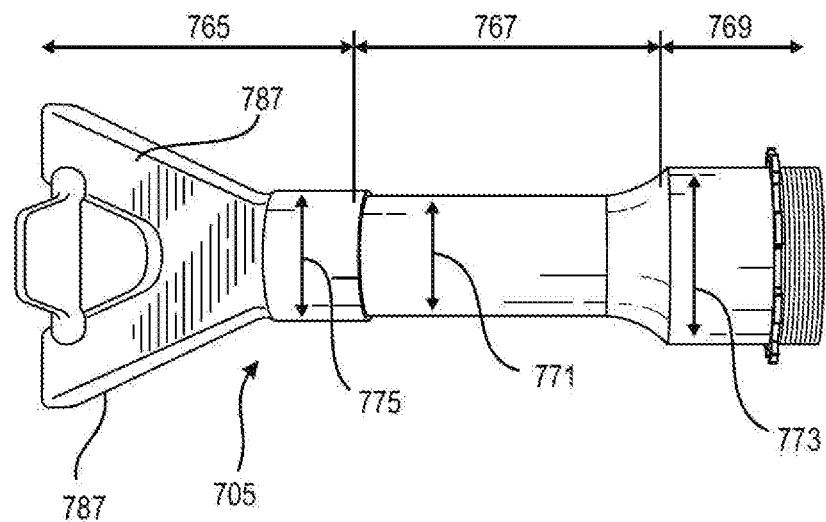
FIGS. 7A-C depict three views of the nozzle according to various embodiments disclosed herein.
Figure 7B:
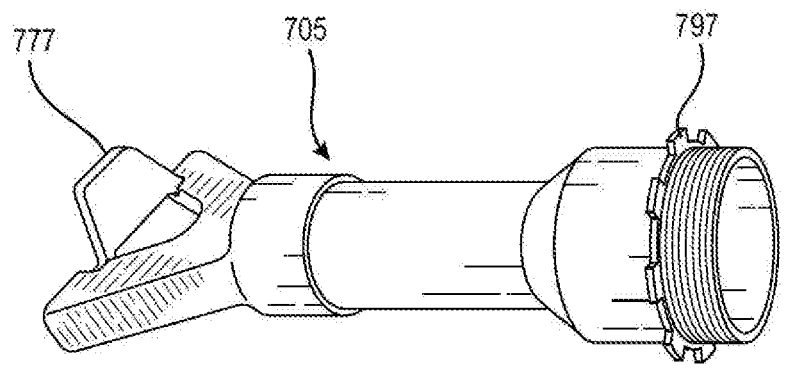
Figure 7C:
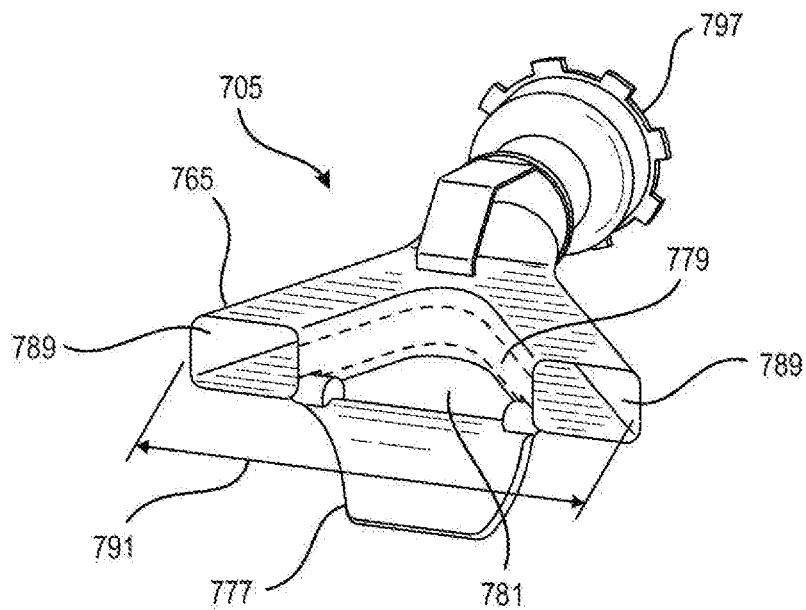

FIGS. 7A-C depicts three views of the nozzle 705 according to various embodiments disclosed herein. FIG. 7A shows the three sections of nozzle 705—the nozzle inlet section 769, the neckdown section 767, and the nozzle outlet section 765. In various embodiments the nozzle outlet section 765 has a "Y" shaped outlet that disperses air around the inside of the wheel and tire rather than blowing a single stream of air directly at the hub of the wheel. The nozzle 705 may also be configured with a tab 777 mounted between the arms of the "Y" shaped nozzle outlet. A user can position the tab 777 against the rim so as to hold the pneumatic tire seater nozzle 705 steady while aiming it between the gap between the tire and the wheel. Various embodiments of the pneumatic tire seater do not have tab 777 since it tends to be more effective in seating a tire to hold the pneumatic tire seater nozzle 705 an inch or more away from the gap between the tire and the wheel and the tab 777 tends to obstruct the air flow between the Y intersection of the nozzle outlet.

Turning again to FIG. 7A, the figure depicts the inside diameter 771 of the neckdown section 767, the inside diameter 775 of nozzle outlet section 765, and the inside diameter 773 of nozzle inlet section 769. In various embodiments the inside diameter 771 of the neckdown section 767 is less than the inside diameter 773 of nozzle inlet section 769. This neckdown in the tube size of air path serves to increase the velocity of the air released from the RAR valve through the Venturi effect. Various embodiments of the nozzle have an assortment of different neckdown and inlet dimensions.

The embodiment depicted in FIG. 7A of nozzle 705 has a neckdown section inside diameter 771 of 1.5 inches and an inlet section inside diameter 773 of 2.125 inches. Since the nozzle 705 neckdown section 767 and inlet section 769 are both round, the respective approximate areas of these passageways are: neckdown section 767 area is 1.8 square inches; and inlet section 769 area is 3.6 square inches. The ratio between the areas of the two passage ways has an impact on the degree of the Venturi effect that is realized. The ratio of the nozzle inlet area to the neckdown section area is referred to herein as the nozzle neckdown ratio (nozzle inlet area/the neckdown section area). The nozzle neckdown ratio of the nozzle 705 embodiment depicted in FIG. 7A is 2.0 (3.6 in$^2$/1.8 in$^2$). Various embodiments of the nozzle have nozzle inlets and neckdown cross-sections with a number of different shapes aside from round, including for example: square, rectangular, oval, oblong, rectangular with rounded ends, non-symmetrical, triangular, or other such shapes as are known to those of ordinary skill in the art. These various embodiments of the nozzle have an assortment of nozzle neckdown ratios. For example, in different embodiments the nozzle neckdown ratio may be 1.2 or greater, may be 1.5 or greater, may be 1.75 or greater, may be 2.0 or greater, or may be 2.5 or greater. In some embodiments the nozzle neckdown ratio may be 1.2 to 1.8, may be 1.5 to 2.5, may be 1.75 to 3.5, may be 2.0 to 4.0, or may be 2.5 to 5.0.

FIG. 7B is an oblique view of nozzle 705 according to various embodiments disclosed herein. In various embodiments the nozzle 705 is provided with male threads on its proximal end (opposite the nozzle output). The male threads are configured to fit female threads just inside the distal end of cylinder 310 as shown in FIG. 3D. A lock washer 797 may be provided on the male threads of the nozzle 705 proximal end. The lock washer 797 may be tightened down in order to properly align the nozzle 705 with the pneumatic tire seater, e.g., to align a line bisecting the pair of nozzle outlet holes 789 with the flat portion 663 of carry handle 615 shown in FIG. 6A.

FIG. 7C is an oblique view showing the nozzle outlet at distal end of nozzle 705. The nozzle may be attached to an RAR pneumatic tire seater by screwing the male threaded end of the nozzle into the female threads of the RAR valve cylinder and tightening the lock nut 793 against the outlet surface of the RAR valve cylinder (e.g., cylinder 310 depicted in FIG. 3D). The nozzle outlet is "Y" shaped to direct air around the inside of the tire and wheel rather than blowing a single stream of air directly at the hub of the wheel. The throat 781 of nozzle 705 is the crotch of the "Y" shape. Various embodiments of nozzle 705 are configured with a gap or vent 779 that spans the surface of the throat 781. The vent connects from the nozzle outlet hole 789 of one nozzle outlet arm 787 to the nozzle outlet hole 789 of the other nozzle outlet arm 787. Initially it was thought that this vent 779 simply aided in distributing the pressurized air around the inside of the tire and wheel. Recently, however, it was discovered that the vent 779 pulls air in from the atmosphere near the nozzle 705 to go into the tire, in addition to the pressurized air blown from within the tank. To promote this effect some embodiments of the nozzle 705 are constructed without tab 777, since tab 777 tends to impede air being pulled into the tire-wheel gap by the pressurized air flowing from vent 779. In the embodiment depicted in FIG. 7A-D, the nozzle width 791 (just outside the outlet holes 789) is approximately 4.25 inches. In various embodiments the nozzle width 791 may be no greater than 3.0 inches, no greater than 4.5 inches, no greater than 5.0 inches, no greater than 7.0 inches, or no greater than 12.0 inches. Other embodiments may have predefined nozzle widths that are wider or narrower than these specified ranges.

Figure 7D:
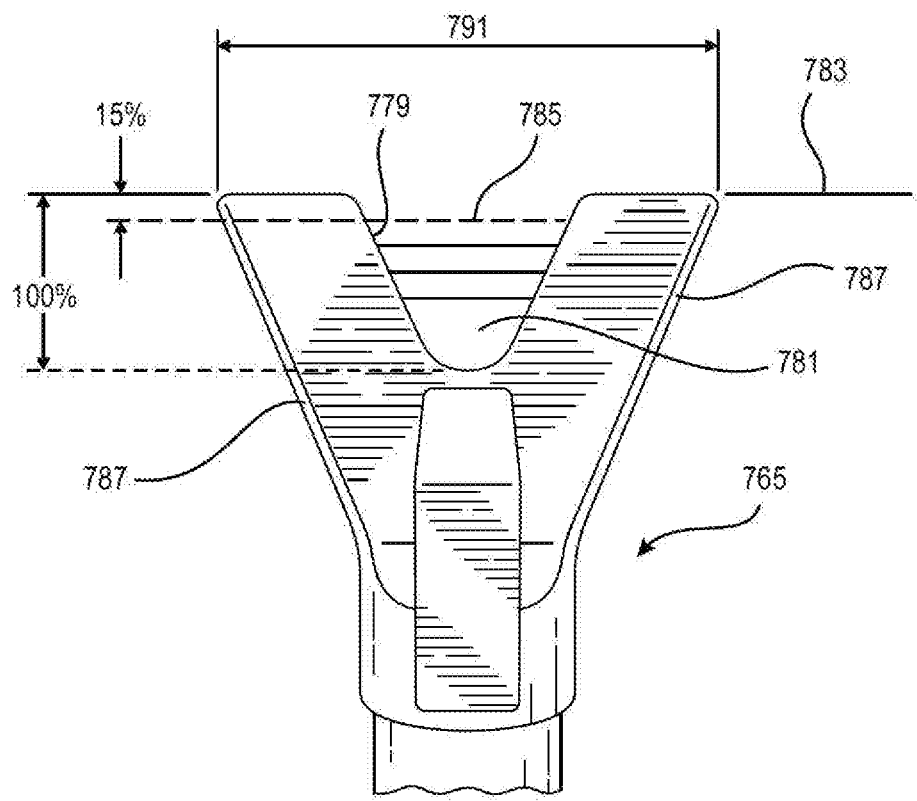
FIG. 7D depicts a nozzle outlet section, according to various embodiments disclosed herein.

FIG. 7D depicts nozzle outlet section 765, according to various embodiments disclosed herein. Nozzle outlet section 765 is "Y" shaped, and as such, has two nozzle outlet arms 787 and a throat 781 between the two nozzle outlet arms 787. Line 783 is drawn across the tips (extreme distal points) of the two nozzle outlet arms 787. A vent 779 is configured within the throat 781 of the nozzle outlet section 765 along the inner surface of each nozzle outlet arm 787. To distinguish the vent 779 from the nozzle outlet holes 789, the vent 779 is defined as the gap (or gaps) in the nozzle throat 781 from a point 15% inward from the tips of each nozzle outlet arm 787 to 100% of the depth of the throat in a proximal direction, as shown in FIG. 7D. (The line 785 is drawn parallel to line 783 and inward 15% of the way into the throat of the nozzle.) The vent 779 is an opening (or multiple openings) into the interior of nozzle outlet section 765 that allow(s) air to pass out in addition to the air passing out of the nozzle outlet holes 789. The section of the nozzle from 0% to 15% inward from the tips may either be open, as shown in FIG. 7C, or may be closed—depending upon the particularities of the given nozzle implementation.

The ratio of the area of the outlet holes 789 to the area of the vent 779 has an impact on the effectiveness of the air being pulled into the gap between the tire and the rim. This ratio is referred to herein as the nozzle outlet-vent ratio. In the embodiment depicted in FIGS. 7A-D each of the outlet holes 789 has an area of approximately 0.645 square inches, and the area of the vent 779 (between the 15% points in FIG. 7D) is approximately 0.773 square inches. The area of both outlet holes 789 together is 1.290 square inches (0.645×2). Hence, the nozzle outlet-vent ratio of the FIGS. 7A-D embodiments is 1.290/0.773, or 1.667. The various embodiments have a nozzle outlet-vent ratio that conform to one or more of the following ranges: 0.2 or greater; 0.5 or greater; 0.8 or greater; 1.0 or greater; 1.2 or greater; 1.5 or greater; 2.0 or greater; between 0.2 and 1.0; between 0.5 and 1.5; between 0.8 and 20.0; between 1.0 and 2.5; between 1.2 and 3.0; between 1.5 and 3.5; between 2.0 and 4.0; less than 1.0; less than 1.5; less than 2.0; less than 3.0; less than 4.0; or less than 5.0.

Figure 8:
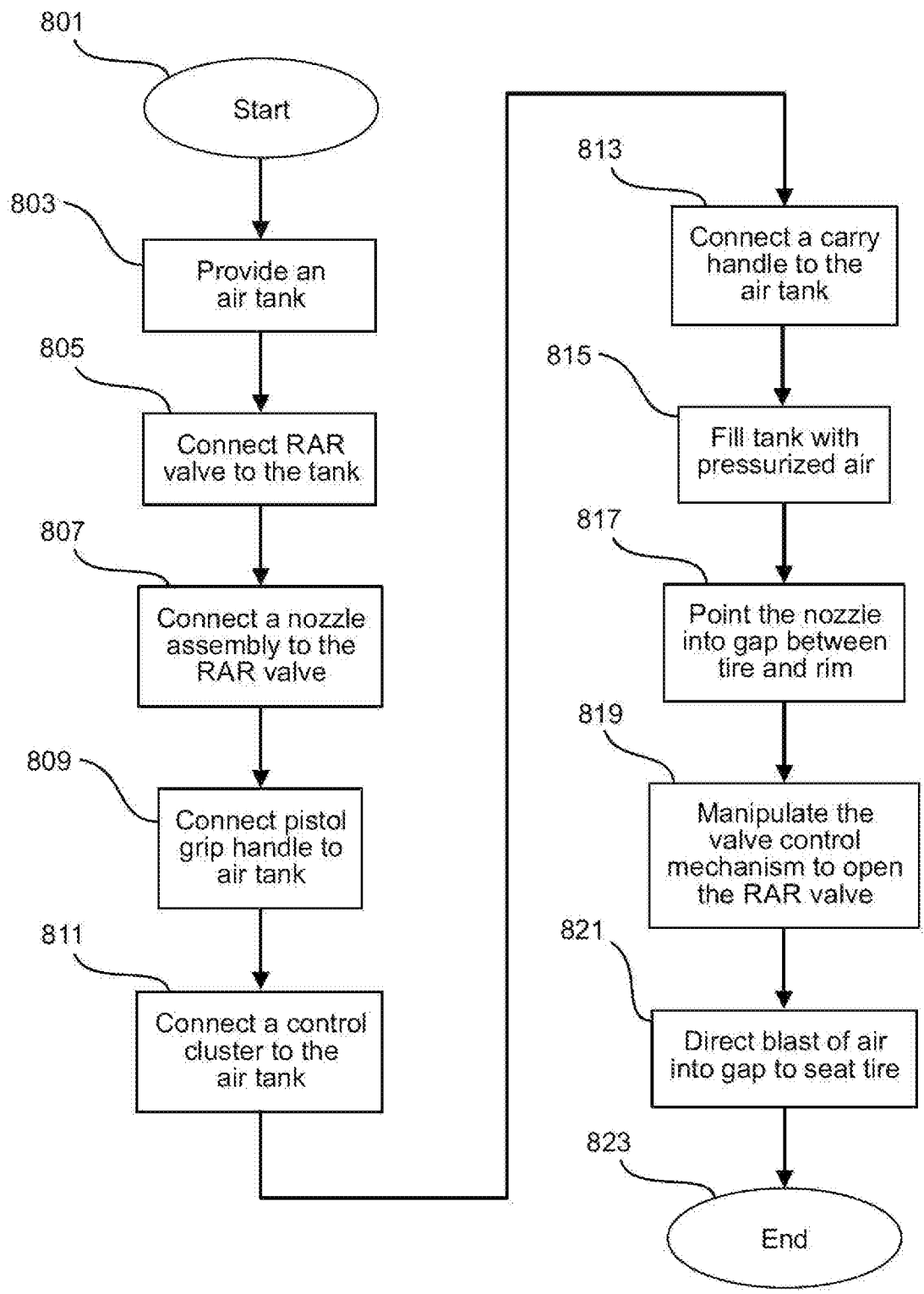
FIG. 8 is a flowchart depicting the use of the RAR pneumatic tire seater according to various embodiments of the invention.

FIG. 8 is a flowchart depicting the use of the RAR pneumatic tire seater according to various embodiments of the invention. The method begins at block 801 and proceeds to block 803 where an air tank is provided. The air tank may be one such as those depicted in FIG. 1A or the tank depicted in FIGS. 2A-C. Upon procuring a tank the method proceeds to block 805 where the RAR valve is attached to the tank. In various embodiments the RAR valve is inserted through a hole of the appropriate size in the distal (front) end of the tank. The RAR valve has a conduit attached to its proximal end such as the conduit 504 depicted in FIGS. 5A-B. In some embodiments, when inserting the RAR valve in the front hole of the tank the conduit is inserted first and lined up to just pass through a hole where the pistol grip is attached to the tank. The RAR valve and conduit are then both welded to provide an airtight seal to their respective holes in the tank. In other embodiments the conduit hole in the tank may be in a location other than beneath the pistol grip.

The method then proceeds to step 807 for attachment of a nozzle assembly to the RAR valve. In various embodiments this is done by threading male threads of the nozzle proximal (rear) end into female threads provided just inside the distal (front) end of the RAR valve. In other embodiments the female threads may be configured within the nozzle while the RAR valve protrudes out of the tank with male threads to fit the nozzle. In yet other embodiments the nozzle may be affixed to the RAR valve by welding, gluing, compression fitting, or other such means of attachment. Upon attaching the nozzle to the RAR valve the method proceeds to block 809 to connect a handle to the tank.

In block 809 a handle is connected to the air tank. In various embodiments the handle is a pistol grip handle such as the pistol grip handle 107 depicted in FIGS. 1A-B. In some embodiments the handle may be connected either to the tank itself or to a connector attached to the conduit that extends from the RAR valve to the bottom of the tank. In other embodiments the handle may be connected directly to the tank, e.g., by an adhesive, or if the handle is metal, by welding. In various embodiments the conduit may be provided in multiple pieces, with one piece extending only a short distance out of the tank, e.g., less than 0.25 inch. In such embodiments the process of connecting the handle may involve connecting an extension of the conduit to the control valve 519 as shown in FIG. 5A. The portion of the conduit that extends out of the tank to the control valve 519 is reflected as dotted lines in FIG. 5A. Once the handle is connected to the tank in block 809 the method proceeds to block 811.

In block 811 a control cluster is connected to the air tank. The control cluster provides pneumatic communication to the inside of the tank for multiple devices (e.g., a pressure gauge, an inlet valve, and a relief valve) via a single access inlet in the tank. This avoids the need to drill multiple holes in the air tank for the various devices connected to it. Upon connecting the control cluster and completing block 811 the method proceeds to block 813. In block 813 a carry handle is connected to the tank. For those embodiments with the control cluster mounted in the manner shown in FIG. 6A the carry handle aids in protecting the control cluster from damage when the tire seater is set upside down on a planar surface table that coincides with the clearance line 661 of FIG. 6A. The carry handle also serves as a convenient hand-hold for carrying the pneumatic tire seater and for hanging it up on a wall.

Upon completing the assembly of the pneumatic tire seater with connection of the carry handle in block 813 the method proceeds to block 815 where the tank is filled with pressurized air. The amount of air to be pumped into the tank—as determined by the reading on the pressure gauge—is determined by the type and size of tire being seated. Larger tires contain a larger volume of air, and thus require a high pressure in the air tank to seat them. A typical pressure used to fill car and truck tires may be within the range of 100 psi to 150 psi. In other instances the tank may be filled to higher pressures or lower pressures, depending upon the specifics of the tire to be seated. Upon filling the tank in block 815 the method proceeds to block 817 to seat a tire using the device.

In block 817 the user points the nozzle into the gap between the tire to be mounted and the wheel. It was discovered by the present inventors that the device works best with the nozzle an inch or so away from the gap, rather than placing the nozzle directly within the gap. For this reason some models of the bead seater are provided without the tab 777 mounted between the arms of the "Y" shaped nozzle outlet as shown in FIGS. 7A-C. In such embodiments there is typically no tab 777 and nothing between the "Y" shaped outlet arms of the nozzle to impede flow of the air into the gap between the tire and the wheel. Upon directing the nozzle into the gap between the tire and the wheel the method proceeds to block 819.

In block 819 the user manipulates a valve control mechanism—e.g., the valve control mechanism 517 shown in FIG. 5A—to open the RAR valve. In the embodiment depicted in FIGS. 5A-B this is done by pressing the valve control mechanism 517 mechanism which is a button in the implementation depicted in the figure. In other embodiments the valve control mechanism 517 may be a trigger, a twist valve, a valve lever, a switch, an electronic control in communication with a valve, or other such valve control mechanisms as are known by those of ordinary skill in the art. Upon opening the valve in block 819, the method proceeds to block 821 to direct the blast of air in between the tire and rim, thus seating the tire. Once the tire is seated the method proceeds to block 823 and ends.

Various activities may be included or excluded as described above, or performed in a different order as would be known by one of ordinary skill in the art, while still remaining within the scope of at least one of the various embodiments. For example, the carry handle may (and generally is) connected to the tank (block 813) before connecting the control cluster to the tank (block 811). Further, blocks 805 to 813 may be implemented in various different orders. The descriptions contained in this disclosure are written in terms of an RAR valve used as part of a pneumatic tire seater tire mounting device. However, the RAR valve may be used in other types of devices or for other purposes.

For the sake of brevity within this disclosure the RAR valve cylinder 310, piston 314 and various other components are referred to herein and depicted as being circular in cross-section, e.g., as shown in FIG. 3A. However, in practice the cylinder 310, piston 314 and various other components may have a cross-section other than round—that is, they may be any number of shapes or sizes aside from having a round cross-section. For example, the various components may be implemented with cross-sections that are round, oval, oblong, square, triangular, rectangular (slotted), pentagonal, hexagonal, with rounded corners, with square, triangular or other sharp corners, a non-symmetrical shape, or other like shapes as are known to those of ordinary skill in the art. In the discussion above the RAR valve and conduit are said to be affixed to the tank by welding the parts to the tank walls. In practice, however, the various parts may be affixed to each other by any of several different fastening means, including for example, by gluing or use of other adhesives, by taping, by compression fitting, by using threaded connections, or other such means of affixing components as are known to those of ordinary skill in the art.

The terminology used herein is for the purpose of describing particular embodiments only and is not intended to be limiting of the invention. As used herein, the singular foams "a", "an" and "the" are intended to include the plural forms as well, unless the context clearly indicates otherwise. It will be further understood that the terms "comprises," "comprising," "includes," and/or "including" used in this specification specify the presence of stated features, integers, steps, operations, elements, and/or components, but do not preclude the presence or addition of one or more other features, integers, steps, operations, elements, components, and/or groups thereof. The term "plurality", as used herein and in the claims, means two or more of a named element. It should not, however, be interpreted to necessarily refer to every instance of the named element in the entire device. Particularly, if there is a reference to "each" element of a "plurality" of elements. There may be additional elements in the entire device that are not be included in the "plurality" and are not, therefore, referred to by "each."

The word "substantially" (e.g., substantially vertical or substantially one foot) as used herein in the specification and claims is meant to mean plus or minus as much as 2%. For example, substantially one foot as used herein means any length within the range of 1 foot+/−0.02 foot. Similarly, an angle of 10 degrees as used herein means any angle within the range of 10 degrees+/−0.2 degree. The word "approximately" as used herein means the same as the word "substantially." The phrase "slightly less than" as used herein, is defined to mean at least 98.5% of. For example, an outside diameter of the piston that is slightly less than the cylinder's inside diameter means that the piston's diameter is at least 98.5% of the cylinder's inside diameter. The phrase "back and forth" as used herein describing the motion of a first part relative to a second part means that the first part moves one way (e.g., distal direction) relative to the second part, and then moves the other way (e.g., proximal direction) relative to the second part. For example, a piston that moves back and forth within a cylinder moves towards a distal end of the cylinder, then changes direction to move toward a proximal direction of the cylinder.

Two components that are in "pneumatic communication" with each other, as this phrase is used herein, means that air (e.g., pressurized air or gas) passes between the two components. The phrase "pneumatically connected" means the same as "in pneumatic communication." More than two components can be "in pneumatic communication" (or be pneumatically connected). For example, the pressure gauge 655, the inlet valve 657 and the relief valve 659 are each in pneumatic communication (or in other words, are pneumatically connected) with the interior of the air tank 601 via the three-way air manifold of the control cluster 609 as shown in FIGS. 6A-B. This means that high pressure air within the air tank passes through the three-way air manifold of the control cluster 609 to each of the pressure gauge 655, the inlet valve 657 and the relief valve 659. Two different types of pneumatic communication are disclosed herein for the various embodiments, namely: "unconstrained pneumatic communication", and "constrained pneumatic communication." Typically, in the open position the RAR valve of pneumatic tire seater disclosed herein (e.g., embodiment 110 of FIG. 1A) provides unconstrained pneumatic communication between the interior of the tank and the outside atmosphere.

Unconstrained pneumatic communication: Two pneumatically connected components that pass air between each other in a relatively unrestrained manner are said to be in "unconstrained pneumatic communication." For the purposes of defining this term (at standard atmospheric temperature and pressure (STP)), a 0.25 inch long hole with a diameter of at least 0.5 inch between two components provides "unconstrained pneumatic communication" of air or other gas between the two components. For example, a pressurized air tank connected to a nozzle with a gas valve that opens to a 0.5 inch round hole that is 0.25 inch long (between the tank and the nozzle) provides unconstrained pneumatic communication between the tank and the nozzle. Moreover, a hole of any cross-section shape or length that provides the same air flow as 0.25 inch long round hole with a diameter of at least 0.5 inch also provides unconstrained pneumatic communication of air or other gases.

Constrained pneumatic communication: Two pneumatically connected components that pass air between each other in a relatively restricted manner are said to be in "constrained pneumatic communication." For the purposes of defining this term (at STP), a 0.25 inch long hole between two components with a diameter of less than 0.5 inch provides "constrained pneumatic communication" between the two components. For example, a pressurized air tank connected to a control chamber by a 0.25 inch long round passageway that is slightly less than 0.5 inch in diameter provides constrained pneumatic communication between the tank and the control chamber. Moreover, a hole of any cross-section shape or length that provides the same air flow as 0.25 inch long round hole with a diameter of less than 0.5 inch also provides constrained pneumatic communication of air or other gases.

A "two-state open/close gas valve", as this phrase is used herein, has an open state and a closed state. The "two-state open/close gas valve" holding a pressurized tank of gas (e.g., air) remains in a closed state until its valve switch component is actuated, and moves rapidly to an open state in response to the valve switch component being actuated (i.e., here "rapidly" means in 250 ms or less). The "two-state open/close gas valve" holding back pressurized gas cannot be set at an intermediate opened state between the open state and the closed state, and is only in a partially opened state as is rapidly (i.e., in 250 ms or less) moves from the open state to the closed state. The "two-state open/close gas valve" opens at the same rate independent of how fast the user manipulates the valve switch component. That is, pulling the trigger (valve switch component) faster does not make the valve open any faster. In response to a user actuating the valve switch component the two-state open/close gas valve rapidly changes states from the closed state to the open state allowing the pressurized gas to pass through the valve.

Some components disclosed herein are connected together in unconstrained pneumatic communication so that air can flow freely between them. For example, the RAR valve of various embodiments is in unconstrained pneumatic communication with the air storage tank. Other components disclosed herein are connected together in constrained pneumatic communication so that air flows between them in a restricted manner. For example, in various embodiments the RAR valve is constructed to that the control chamber (area behind the piston) is in constrained pneumatic communication with the air storage tank. Yet other components may be connected in either manner, in accordance with various embodiments. For example, depending upon the particularities of a given implementation the conduit between the control chamber and the control valve (e.g., conduit 304 of FIGS. 5A-B) may provide either constrained or unconstrained pneumatic communication between the control chamber and the atmosphere outside the air tank. Such components that may be designed either way are simply said to be in "pneumatic communication" (or said to be "pneumatically connected") without specifying the relationship to be either constrained or unconstrained.

The term "pressurized air" means air that has been compressed to have a pressure of greater than atmospheric pressure (or similarly for "pressurized gas"). In regards to the term "pressurized air" it is understood that upon releasing the pressurized air from the air tank, the pressure of that air drops considerably—although it is still pressurized above atmospheric pressure upon being received within a seated tire. To simplify the explanation herein, the pressurized air released from the air tank will still be called pressurized air even when it has been released from the tank and blown from the nozzle, so as to distinguish it from all other air or gases within the atmosphere outside of the air tank. In regards to the term "airtight seal" it is understood that, given enough time, nearly any tank with a valve that is filled with pressurized gas will eventually leak out at least some of the pressurized gas. The term "airtight seal" as used herein is defined to mean that no more than 1 liter of a gas contained within the receptacle at 100 psi will leak past the airtight seal within a 30 minute period. The phrase "affixed in an airtight manner" is defined to mean being affixed with an airtight seal. For example, an RAR valve that is affixed in an airtight manner to an air tank won't leak at the seam where the two components are affixed at a rate of more than 1 liter of the gas contained in the receptacle at 100 psi within a 30 minute period. The term "substantially airtight seal" as used herein is defined to mean that no more than 1 liter of a gas (e.g., air) contained within the receptacle (e.g., air tank 101) at 100 psi will leak past the airtight seal within a 10 minute period. The phrase "affixed in a substantially airtight manner" is defined to mean being affixed with a substantially airtight seal. The piston 314 configured with a distal O-ring 318 as shown in FIG. 3A forms an airtight seal against the slotted lock collar 320 with the RAR valve in the closed position. In various embodiments, so long as the surface of the components are not worn, damaged, or soiled with impurities the RAR valve in a closed position will typically maintain an airtight seal for at least several hours.

Air tanks, such as tank 102 and tank 101 shown in FIG. 1A, must be certified to be safe at a given pressure. The term "certified" as used herein means that the tank has been CE certified (Conformité Européenne)—or certified by an authorized governmental agency in another country—for inflation to a given pressure. For example, a tank may be certified for pressures up to 300 psi—meaning that it is certified by CE or other government's agency for inflation up to 300 psi. The phrase "certified at no less than 300 psi" means that the certification by CE or another governmental agency is at least 300 psi, and may be certified at a pressure higher than 300 psi (e.g., may be 350 psi, 400 psi, 850 psi, etc.).

The corresponding structures, materials, acts, and equivalents of all means or step plus function elements, if any, in the claims below are intended to include any structure, material, or act for performing the function in combination with other claimed elements as specifically claimed. This disclosure of the various embodiments has been presented for purposes of illustration and description, and is not intended to be exhaustive in the form disclosed. Many modifications and variations will be apparent to those of ordinary skill in the art without departing from the scope and gist of the invention. The various embodiments included herein were chosen and described in order to best explain the principles of the invention and the practical application, and to enable others of ordinary skill in the art to understand the invention for various embodiments with various modifications as are suited to the particular use contemplated. The description of the various embodiments provided above is illustrative in nature inasmuch as it is not intended to limit the invention, its application, or uses. Thus, variations that do not depart from the intents or purposes of the invention are encompassed by the various embodiments of the present invention. Such variations are not to be regarded as a departure from the intended scope of the present invention.

The invention claimed is:

1. A pneumatic tire seater for seating a tire on a wheel, the pneumatic tire seater comprising:
    an air tank configured to hold pressurized air in an interior of the air tank;
    the air tank having an inside diameter of no greater than 6 inches;
    a gas valve in unconstrained pneumatic communication with the interior of the air tank, the gas valve being configured with an endcap at a proximal end of the gas valve;
    a piston included as part of the gas valve, the piston being configured to slide back and forth within a cylinder of the gas valve, wherein a distal end of the piston is configured to be seated in a closed position against a portion of the gas valve to prevent the pressurized air from escaping from the air tank;
    a control chamber formed within the cylinder between the endcap of the gas valve and a proximal end of the piston; and
    one or more control gas passageways including a gap between the piston and an interior wall of the cylinder that allow some of the pressurized air to bleed past the piston into the control chamber;
    an O-ring trough provided around a circumference of the piston;

one or more control gas holes configured in the piston to run in an axial direction between the O-ring trough and the proximal end of the piston;

wherein, in response to being opened the gas valve releases the pressurized air from the air tank in a burst sufficient to seat the tire on a rim of the wheel.

2. The pneumatic tire seater of claim 1,
wherein the gas valve is a two-state open/close gas valve; and wherein the one or more control gas holes provide constrained pneumatic communication between the control chamber and the pressurized air in the air tank.

3. The pneumatic tire seater of claim 1, further comprising:
a control valve comprising a control valve inlet pneumatically connected to the control chamber and a control valve outlet that opens to atmosphere outside the air tank;
wherein the gas valve opens in response to the control valve being actuated.

4. The pneumatic tire seater of claim 3, further comprising:
a conduit pneumatically connecting the control chamber to the control valve inlet;
wherein opening the control valve results in the control chamber becoming pneumatically connected to the atmosphere via the conduit; and
wherein the air tank can hold a pressure of at least 300 psi.

5. The pneumatic tire seater of claim 1, wherein the valve has a valve/tank ratio equal or greater than 40% as measured using an inside diameter of the cylinder and an outside tank diameter of the air tank.

6. The pneumatic tire seater of claim 1, further comprising:
a nozzle connected to a distal end of the gas valve, said nozzle comprising a distal end with one or more nozzle outlet holes configured to direct the pressurized air into a gap between the tire and the rim; and
a flexible sealing component included as part of the gas valve and being configured to removably seat on a portion of the gas valve in an airtight manner.

7. The pneumatic tire seater of claim 6, further comprising:
a nozzle outlet section configured as part of the nozzle and being in unconstrained pneumatic communication with the gas valve, the nozzle outlet section comprising first and second nozzle arms, the first nozzle arm comprising a first nozzle outlet hole and the second nozzle arm comprising a second nozzle outlet hole; and
a vent configured as part of the nozzle outlet section configured to span a throat of the nozzle outlet section between the first nozzle outlet hole and the second nozzle outlet hole.

8. The pneumatic tire seater of claim 7,
wherein the vent and the first and the second nozzle outlet holes are characterized by a nozzle outlet-vent ratio of 1.0 or greater; and
wherein the air tank is cylindrical with rounded ends and has an outside tank diameter of between 3.75 and 6.5 inches.

9. The pneumatic tire seater of claim 1, further comprising:
a control cluster comprising at least two devices, the control cluster being pneumatically connected to the interior of the air tank;
wherein the at least two devices are selected from the group consisting of a pressure gauge, an inlet valve and a relief valve.

10. The pneumatic tire seater of claim 1, further comprising:
a compression spring positioned within the cylinder between the endcap and the proximal end of the piston; and
a cushion positioned within the cylinder between the endcap and the proximal end of the piston; and
wherein the gas valve has an opening time of no greater than 150 ms.

11. The pneumatic tire seater of claim 1, further comprising:
a lock collar configured to be removably affixed inside the distal end of the gas valve, the lock collar comprising said portion of the gas valve that removably seats the flexible sealing component.

12. A method of constructing pneumatic tire seater for seating a tire on a wheel, the method comprising:
providing an air tank configured to hold pressurized air in an interior of the air tank, the air tank having an inside diameter of no greater than 6 inches;
affixing a gas valve in unconstrained pneumatic communication with the interior of the air tank, the gas valve being configured with an endcap at a proximal end of the gas valve;
including a piston as part of the gas valve, the piston being configured to slide back and forth within a cylinder of the gas valve, wherein a distal end of the piston is configured to be seated in a closed position against a portion of the gas valve to prevent the pressurized air from escaping from the air tank;
forming a control chamber within the cylinder between the endcap of the gas valve and a proximal end of the piston;
configuring one or more control gas passageways, including a gap between the piston and an interior wall of the cylinder, to allow some of the pressurized air to bleed past the piston into the control chamber;
fashioning an O-ring trough provided around a circumference of the piston;
configuring one or more control gas holes in the piston to run in an axial direction between the O-ring trough and the proximal end of the piston;
and opening the gas valve to release the pressurized air from the air tank in a burst sufficient to seat the tire on a rim of the wheel.

13. The method of claim 12,
wherein the gas valve is a two-state open/close gas valve; and
wherein the one or more control gas holes provide constrained pneumatic communication between the control chamber and the pressurized air in the air tank.

14. The method of claim 12, further comprising:
providing a control valve comprising a control valve inlet pneumatically connected to the control chamber and a control valve outlet that opens to atmosphere outside the air tank; and
pneumatically connecting the control chamber to the control valve inlet with a conduit;
wherein the gas valve opens in response to the control valve being actuated;
wherein opening the control valve results in the control chamber becoming pneumatically connected to the atmosphere via the conduit; and
wherein the air tank can hold a pressure of at least 300 psi.

15. The method of claim 12, further comprising:
- connecting a nozzle to a distal end of the gas valve, said nozzle comprising a distal end with one or more nozzle outlet holes configured to direct the pressurized air into a gap between the tire and the rim; and
- including a flexible sealing component as part of the gas valve, and configuring the flexible sealing component to removably seat on a portion of the gas valve in an airtight manner;
- providing a nozzle outlet section configured as part of the nozzle and being in unconstrained pneumatic communication with the gas valve, the nozzle outlet section comprising first and second nozzle arms, the first nozzle arm comprising a first nozzle outlet hole and the second nozzle arm comprising a second nozzle outlet hole; and
- configuring a vent as part of the nozzle outlet section, the vent spanning a throat of the nozzle outlet section between the first nozzle outlet hole and the second nozzle outlet hole.

16. The method of claim 15,
- wherein the valve has a valve/tank ratio equal or greater than 40% as measured using an inside diameter of the cylinder and an outside tank diameter of the air tank;
- wherein the vent and the first and the second nozzle outlet holes are characterized by a nozzle outlet-vent ratio of 1.0 or greater;
- wherein the air tank is cylindrical with rounded ends and has an outside tank diameter of between 3.75 and 6.5 inches; and
- wherein the gas valve has an opening time of no greater than 150 ms.

17. The method of claim 12, further comprising:
- providing a control cluster comprising at least two devices, the control cluster being pneumatically connected to the interior of the air tank;
- wherein the at least two devices are selected from the group consisting of a pressure gauge, an inlet valve and a relief valve.

* * * * *